United States Patent [19]

Grundland

[11] Patent Number: 5,499,203
[45] Date of Patent: Mar. 12, 1996

[54] LOGIC ELEMENTS FOR INTERLACED CARRY/BORROW SYSTEMS HAVING A UNIFORM LAYOUT

[76] Inventor: Nathan Grundland, 6 Alkalai St., Rehovot, Israel

[21] Appl. No.: 126,650

[22] Filed: Sep. 27, 1993

[30] Foreign Application Priority Data

Sep. 27, 1992 [IT] Italy ........................ 103299
Aug. 29, 1993 [IT] Italy ........................ 106830

[51] Int. Cl.$^6$ ........................................ G06F 7/50
[52] U.S. Cl. ........................... 364/786; 364/787
[58] Field of Search ........................ 364/768, 784, 364/786, 787, 788

[56] References Cited

U.S. PATENT DOCUMENTS 4,882,698 11/1989 Young .................... 364/787 X
5,043,934 8/1991 Lamb ........................ 364/787
5,235,539 8/1993 Patel ......................... 364/787

*Primary Examiner*—Roy N. Envall, Jr.
*Assistant Examiner*—Chuong D. Ngo
*Attorney, Agent, or Firm*—Edward Langer

[57] ABSTRACT

Logic elements for use in carry/borrow and comparator systems, which operate in accordance with the IMPLY logical relationship. Utilization of the IMPLY logical relationship overcomes the inherent complication of inversion so that it becomes an effective benefit, making possible uniform carry system layouts with uniform logic elements using a newly defined gate pair combination in general. The gate pair logic elements provide a novel carry-propagate signal (P) which includes a redundant carry-generate signal (G), thereby defining a novel carry-integrate signal (I). The novel carry-integrate, signal (I) together with the carry-generate signal (G) define a signal pair utilized in succeeding carry levels which are organized in a simplified fashion. For-2-bit position (i+1, i) positive sense logic, the carry-integrate signal can be represented by $I(i+1, i) = G(i+1) + P(i+1) \cdot P(i)$. Wherever the IMPLY relationship is involved in logic functions, the design of CMOS gates is affected and can be modified. The novelty is characterized in the embodiment of gates featuring Symmetrical structure of switching pairs and crosswise (Anti-Symmetrical) wiring actuating these pairs (SAS gates), where pairs of gates are not fed by a common input signal, rather they are fed by a pair of signals having the IMPLY relationship. This leads to a special family of gates which are useful for the design of carry systems and are also independently adaptable for other specific logic functions including gates having the Tri-State feature, such as bit-sum cells and an arithmetic ZERO detection circuit.

21 Claims, 15 Drawing Sheets

EXPANDED INTERLACED CARRY SYSTEM
($\underline{Y}$ - represents inversion)

| Col. 01 | Col. 02 | Col. 03 | Col. 04 |
|---|---|---|---|
| LEVEL e0 | LEVEL e1 | LEVEL e2 | LEVELS e3/e4 |
| $C_{in} = C^0{}_1$ | ▷○— $\bar{C}^1{}_1$ | ▷○— $C^2{}_1$ | ▷○— $\bar{C}^3{}_1 = \bar{C}_{out\_1}$ <br> — $C^2{}_1 = C_{out\_1}$ |
| i1 <br> $\bar{X}_1 \cdot \bar{Y}_1 \stackrel{Y}{=} P_1$ <br> $\bar{X}_1 + \bar{Y}_1 \stackrel{Y}{=} G_1$ | $G_1 + P_1 \cdot C^0{}_1 \stackrel{Y}{=} \bar{C}^1{}_2$ | ▷○— $C^2{}_2$ | ▷○— $\bar{C}^3{}_2 = \bar{C}_{out\_2}$ <br> — $C^2{}_2 = C_{out\_2}$ |
| i2 <br> $\bar{X}_2 \cdot \bar{Y}_2 \stackrel{Y}{=} P_2$ <br> $\bar{X}_2 + \bar{Y}_2 \stackrel{Y}{=} G_2$ | $G_2 + P_2 \cdot G_1 \stackrel{Y}{=} \bar{G}_{2,1}$ <br> $G_2 + P_2 \cdot P_1 \stackrel{Y}{=} \bar{I}_{2,1}$ | $\bar{I}_{2,1} + \bar{G}_{2,1} \cdot \bar{C}^1{}_1 \stackrel{Y}{=} C^2{}_3$ | ▷○— $\bar{C}^3{}_3 = \bar{C}_{out\_3}$ <br> — $C^2{}_3 = C_{out\_3}$ |
| i3 <br> $\bar{X}_3 \cdot \bar{Y}_3 \stackrel{Y}{=} P_3$ <br> $\bar{X}_3 + \bar{Y}_3 \stackrel{Y}{=} G_3$ | $G_3 + P_3 \cdot G_2 \stackrel{Y}{=} \bar{G}_{3,2}$ <br> $G_3 + P_3 \cdot P_2 \stackrel{Y}{=} \bar{I}_{3,2}$ | $\bar{I}_{3,2} + \bar{G}_{3,2} \cdot \bar{C}^1{}_1 \stackrel{Y}{=} C^2{}_4$ | ▷○— $\bar{C}^3{}_4 = \bar{C}_{out\_4}$ <br> — $C^2{}_4 = C_{out\_4}$ |
| i4 <br> $\bar{X}_4 \cdot \bar{Y}_4 \stackrel{Y}{=} P_4$ <br> $\bar{X}_4 + \bar{Y}_4 \stackrel{Y}{=} G_4$ | $G_4 + P_4 \cdot G_3 \stackrel{Y}{=} \bar{G}_{4,3}$ <br> $G_4 + P_4 \cdot P_3 \stackrel{Y}{=} \bar{I}_{4,3}$ | $\bar{I}_{4,3} + \bar{G}_{4,3} \cdot \bar{I}_{2,1} \stackrel{Y}{=} I_{4,1}$ <br> $\bar{I}_{4,3} + \bar{G}_{4,3} \cdot \bar{G}_{2,1} \stackrel{Y}{=} G_{4,1}$ | $G_{4,1} + I_{4,1} \cdot C^2{}_1 \stackrel{Y}{=} \bar{C}^3{}_5$ <br> — $\bar{C}^3{}_5 = \bar{C}_{out\_5}$ <br> ▷— $C^4{}_5 = C_{out\_5}$ |
| i5 <br> $\bar{X}_5 \cdot \bar{Y}_5 \stackrel{Y}{=} P_5$ <br> $\bar{X}_5 + \bar{Y}_5 \stackrel{Y}{=} G_5$ | $G_5 + P_5 \cdot G_4 \stackrel{Y}{=} \bar{G}_{5,4}$ <br> $G_5 + P_5 \cdot P_4 \stackrel{Y}{=} \bar{I}_{5,4}$ | $\bar{I}_{5,4} + \bar{G}_{5,4} \cdot \bar{I}_{3,2} \stackrel{Y}{=} I_{5,2}$ <br> $\bar{I}_{5,4} + \bar{G}_{5,4} \cdot \bar{G}_{3,2} \stackrel{Y}{=} G_{5,2}$ | $G_{5,2} + I_{5,2} \cdot C^2{}_2 \stackrel{Y}{=} \bar{C}^3{}_6$ <br> — $\bar{C}^3{}_6 = \bar{C}_{out\_6}$ <br> ▷— $C^4{}_6 = C_{out\_6}$ |
| i6 <br> $\bar{X}_6 \cdot \bar{Y}_6 \stackrel{Y}{=} P_6$ <br> $\bar{X}_6 + \bar{Y}_6 \stackrel{Y}{=} G_6$ | $G_6 + P_6 \cdot G_5 \stackrel{Y}{=} \bar{G}_{6,5}$ <br> $G_6 + P_6 \cdot P_5 \stackrel{Y}{=} \bar{I}_{6,5}$ | $\bar{I}_{6,5} + \bar{G}_{6,5} \cdot \bar{I}_{4,3} \stackrel{Y}{=} I_{6,3}$ <br> $\bar{I}_{6,5} + \bar{G}_{6,5} \cdot \bar{G}_{4,3} \stackrel{Y}{=} G_{6,3}$ | $G_{6,3} + I_{6,3} \cdot C^2{}_3 \stackrel{Y}{=} \bar{C}^3{}_7$ <br> — $\bar{C}^3{}_7 = \bar{C}_{out\_7}$ <br> ▷— $C^4{}_7 = C_{out\_7}$ |
| i7 <br> $\bar{X}_7 \cdot \bar{Y}_7 \stackrel{Y}{=} P_7$ <br> $\bar{X}_7 + \bar{Y}_7 \stackrel{Y}{=} G_7$ | $G_7 + P_7 \cdot G_6 \stackrel{Y}{=} \bar{G}_{7,6}$ <br> $G_7 + P_7 \cdot P_6 \stackrel{Y}{=} \bar{I}_{7,6}$ | $\bar{I}_{7,6} + \bar{G}_{7,6} \cdot \bar{I}_{5,4} \stackrel{Y}{=} I_{7,4}$ <br> $\bar{I}_{7,6} + \bar{G}_{7,6} \cdot \bar{G}_{5,4} \stackrel{Y}{=} G_{7,4}$ | $G_{7,4} + I_{7,4} \cdot C^2{}_4 \stackrel{Y}{=} \bar{C}^3{}_8$ <br> — $\bar{C}^3{}_8 = \bar{C}_{out\_8}$ <br> ▷— $C^4{}_8 = C_{out\_8}$ |
| i8 <br> $\bar{X}_8 \cdot \bar{Y}_8 \stackrel{Y}{=} P_8$ <br> $\bar{X}_8 + \bar{Y}_8 \stackrel{Y}{=} G_8$ | $G_8 + P_8 \cdot G_7 \stackrel{Y}{=} \bar{G}_{8,7}$ <br> $G_8 + P_8 \cdot P_7 \stackrel{Y}{=} \bar{I}_{8,7}$ | $\bar{I}_{8,7} + \bar{G}_{8,7} \cdot \bar{I}_{6,5} \stackrel{Y}{=} I_{8,5}$ <br> $\bar{I}_{8,7} + \bar{G}_{8,7} \cdot \bar{G}_{6,5} \stackrel{Y}{=} G_{8,5}$ | $G_{8,5} + I_{8,5} \cdot G_{4,1} \stackrel{Y}{=} \bar{G}_{8,1}$ <br> $G_{8,5} + I_{8,5} \cdot I_{4,1} \stackrel{Y}{=} \bar{I}_{8,1}$ |

← P ⊃ G → ← I ⊃ G → ← (I = G) = C →

Zone A         Zone B

TABLE 1

FIG. 9c

LOGIC ELEMENTS FOR INTERLACED CARRY/BORROW SYSTEMS HAVING A UNIFORM LAYOUT

FIELD OF THE INVENTION

The present invention relates generally to switching systems, and more particularly to logic elements or cells having pairs of specific similar logic circuitries comprising inverting output gates or complementary output gates, which are utilized for various {hierarchical} carry systems.

The present invention also features advantages of gate construction using technologies having a complementary nature, as with the C-MOS technology.

BACKGROUND OF THE INVENTION

A well-known technique for improving the computation speed is by constructing a parallel adder/subtractor with a fast carry/borrow speed-up system.

The state of the art presents various kinds of carry systems such as the carry look ahead (CLA) system, reference to "High-Speed Arithmetic in Binary Computers" by O. L. MacSorley, Proceedings of The IRE Jan. 1961 pp. 67: a recurrence solver (RS) system, reference to "A Comparison of Alu Structures for VLSI Technology" by S. Ong and D. E. Atkins, IEEE 1983; and a skip carry (SC) technique, reference to "On Implementing Addition in VLSI Technology" (Variable Block Adder) by Vojin G. Oklobdzija and Earl R, Barnes, Journal of Parallel and distributed Computing 5. 716–728 (1988), and "An 8.5-ns 112-b Transmission Gate Adder with a Conflict-Free Bypass Circuit", by T. Sato, M. Sakate et al., IEEE Journal of Solid State Circuits, Vol. 27, No. 4 (1992); and other techniques, all of which are used for binary bits or BCD digits, 1's or 2's complement, fixed or floating point, sign and magnitude representation with or without a carry-in, etc.

It would be too laborious to show to those who are familiar with the prior art the differences and disadvantages of all the various types of carry systems. Relevant prior art patents on carry systems and adders are as follows:

3,805,045 to Larsen,
3,990,723 to Betany etal.
3,993,891 to Beck et al.
4,118,786 to Levine etal.
4,319,335 to Rubinfeld
4,323,981 to Nakamura
4,504,924 to Cook et al.
4,584,661 to Grundland
4,607,176 to Burrows et al.
4,660,165 to Masumoto
4,858,168 to Hwang
4,870,681 to Sedlak
4,882,698 to Young
4,905,180 to Kumar
4,918,640 to Heimsch et al.

Some typical prior art carry system disadvantages are: the CLA system as an example, requires two AND-NOR gates delay for each CLA level, and this introduces two units of delay, where the unit is taken to be the propagation delay through an AND-NOR gate, the RS system as an example, doubles the fanout of the most loaded output signals in the critical signal path (the worst case path) for every additional carry level, the SC technique, as an example, requires impractical, irregular array construction, having a very high gate fan-in as the adder is expanded.

Due to the technical limits of practical gate construction (fan-in and fan-out), the structure of a carry system is partitioned into groups of bits in parallel at level one of a carry system, then into groups of groups in parallel at level two of a carry system, etc. The conventional CLA system is based on partitioning of four (bits, groups) and the RS system is based on binary tree expansion, partitioning of two.

the layout design regularity, is only partly uniform.

The prior art of adder design can be summarized as follows:

1) An adder is, in general, composed of three parts: the input part, the carry part and the sum part.
2) The carry part is based on a partitioning number R, where R= 2 is a binary partitioning. R = 3 is a ternary partitioning etc.
3) The construction of a binary (partitioned) carry system part requires the implementation of four different signal functions.
4) The CLA system is based on R= 4 but has an example based on R= 5 and there are other implementations. The recurrence solvers technique is basically based on R= 2. Carry systems based on R= 3 also exist.
5) The embodiment of a fast carry system is based on the implementation of a pair of signals, the Generate (G) and the Propagate (P) signals.
6) For R= 2, there are normally required two different signal expressions for each polarity which requires four different gate constructions as shown in prior art FIGS. 1a and 1b. These are respectively the cells for True and False polarity, each including two different gates and having as an example the following signal expression pairs for two bit position (i+1 and i); for True input signals, $G(i+1, i) = G(i+1) + P(i+1) \cdot Gi$ and $P(i+1, i) = P(i+1) \cdot Pi$, and for False input signals, $\overline{G}(i+1, i) = \overline{G}(i+1) \cdot \overline{P}(i+1) + \overline{G}(i+1) \cdot \overline{Gi}$ and $\overline{P}(i+1, i) = \overline{P}(i1) + \overline{Pi}$.

The general concept description of fast carry systems using the generate and propagate functions pairs will now be described, with reference to the prior art FIGS. 1a and 1b.

At each sequential carry level of a carry system there are produced pairs of carry Generate (G) and carry Propagate (P) functions which are further combined with Carry-in (Cin) input signals producing further Carry-out (Cout) output signals:

$$\text{Cout}(k+1) = G\beta + P\beta \cdot \text{Cin}(i+1) \quad \text{(Eq. 1a)}$$

or, $$\text{Cout}(k+1) = \overline{G\beta} \cdot \overline{P\beta} + \overline{G\beta} \cdot \text{Cin}(i+1) \quad \text{(Eq. 1b)}$$

where β represents a bunch of contiguous bits numbered from k to i+1, k≥ i+1. For CLA system β is a function of grouped groups, for RS system β is a function of the numbered carry level L≥ 1.

Normally, two different logical gate combinations are required for implementing, in a binary configuration (binary tree expansion), the signals of Eqs. 1a and 1b which are also required for the implementation of the typical True G and False $\overline{G}$ carry-generate functions which are as follows:

$$G\beta = G\beta 2 + \beta 2 \cdot g\beta 1 \quad \text{(Eq. 2a)}$$

$$\overline{G\beta} = \overline{G\beta 2} \cdot \overline{P\beta 2} + \overline{G\beta 2} \cdot \overline{G\beta 1} \quad \text{(Eq. 2b)}$$

where ⊕2 and β1 represent two respective bits bunches [k≥

(j+1)] and [j≧ (i+1)].

The typical True P and False $\bar{P}$ carry-propagate functions further require two different logical gates as follow:

$$P\beta = P\beta 2 \cdot P\beta 1 = \pi P\beta = \pi P\beta 2 \cdot \pi P\beta 1 \qquad (Eq. 3a)$$

$$\bar{P}\beta = \bar{P}\beta 2 + \bar{P}\beta 1 = \Sigma \bar{P}\beta = \Sigma \bar{P}\beta 2 = \Sigma \bar{P}\beta 1 \qquad (Eq. 3b)$$

where π represent the logical AND of terms and Σ represent the logical OR of terms.

Four different logical INVERTING gates (and inverters) are required for practical design of a carry system having partitioning of 2 and eight different gates are required for conventional CLA having partitioning of 4.

Inversion is an inherent component in logic design techniques, which is used by existing practical design techniques and requires complicated logic combinations.

Texas Instruments, in its component SN74S181, offers essentially, the same two gates circuitries for generating $\bar{G}$ or Y (pin 17) and $\bar{P}$ or X (pin 15) for True and False input signals.

Other disadvantages concern the design with the ECL complementary output logic technology where output signals are not effectively used and the design with CMOS technology where gates are not effectively designed and used.

Generally speaking, the various prior art approaches in designing adders with any technology show poor performance, more particularly with regard to layout regularity (uniformity), level counts and organization, fan-in, fan-out and speed.

OBJECTS OF THE PRESENT INVENTION

A general object of the present invention is to establish a new approach in logic design regarding the specific logic domain, in which a specific pre-existing logic relationship exists.

Another general object of the present invention is to improve the performance of parallel adders constructed in different technologies featuring different advantages, mainly reducing the worst case propagation delay through the adders and to construct them in a most regular (repetitive circuits) layout uniformity.

A further general object of the present invention is to define and construct uniform logical cells, each including a pair of gates with minimum circuitry, utilized as building blocks for producing the carry generate and the carry propagate signal pairs of a carry system in a form that improves the overall adder/subtractor performance.

One object of the present invention is to construct a novel partitioned carry system having an Expanded Interlaced interconnecting pattern for improving carry system performance (reference is made to the paper entitled "Fast Area-Efficient VLSI Adders" by T. Han et al., Arith. Symp. 1987 IEEE p. 54 FIG. 2.1).

Still one further object of the present invention is to construct a novel multibit comparator.

A further object of the present invention is to construct a modified extended bit-sum device, at the summing level of an adder/subtractor.

One further object of the present invention is to construct with a complementary output technology a 16-bit adder having a total of only 3 units (Wired-OR/NOR gates) delay.

One further general object of the present invention is to construct with Complementary (C-MOS) technology, a special group of logical gates characterized in having a symmetrical/anti-symmetrical (SAS) gate construction for use with the logical cells of the novel carry system.

One special object of the present invention is to construct with the C-MOS technology a modified bit-sum device having Tri-State output features.

Still one special object of the present invention is to construct with the C-MOS technology a Three-State gate structure for representing an arithmetic ZERO as a high-impedance output.

Still a further special object of the present invention is to construct, with the C-MOS technology, a special gate that provides an optional programmable carry-in input signal.

SUMMARY OF THE INVENTION

The present invention refers to the design of the carry system using the IMPLY function as a practical guideline for designing a carry system for adders/subtractors.

Recognition by the inventor of the ability to utilize the IMPLY function to overcome the inherent complication of inversion so that it becomes an effective benefit, makes it possible to build uniform carry system layouts with uniform cells using a newly defined gate pair combination in general, and using newly constructed symmetrical anti/symmetrical components which rely on having the inherent logical IMPLY relationship.

By utilizing the IMPLY relation, it is shown that the same general form signal expression is required for the implementation of the six different carry signal functions (four different gates), either by an AND-NOR gate such that $$Y = \overline{U + V \cdot W} \qquad (Eq. 4a)$$

or by an OR-NAND gate such that $$Z = \overline{V \cdot (U + W)} \qquad (Eq. 4b)$$

where U, V and W are inputs, and Y and Z are outputs.

The IMPLY logical relationship, B⊂A, A implies B (which also means that $\bar{B}$ IMPLIES $\bar{A}$ having the relationship $\bar{A} \subset \bar{B}$) is expressed as the logical function $\bar{A} + B = 1$ or by the function $A \cdot \bar{B} = 0$. As regards the present invention, the portion of the IMPLY relationship defined by the relation B= A ($\bar{A} = \bar{B}$) is excluded from consideration, while only the portion of the IMPLY relationship defined by the relation B> A (A⊂B) is applied.

The IMPLY relationship is referred to in the texts "Logic Design of Digital Systems" by D. L. Dietmeyer, Allyn & Bacon, Inc. (1971), pp. 130–131, and in "Modern Switching Theory and Digital Design" by S. C. Lee, Prentice-Hall (1978), p. 38. The invention applies these functions as they relate to two different terms corresponding to the U and V input signals at Eq. 4a and Eq. 4b and to the Propagate and the Generate functions whether for one bit i or for a bunch of bits β.

In this way, the pair of well-known carry-Propagate (P) and carry-Generate (G) functions for one bit are respectively Pi= Xi+ Yi having True input signals (rather than Pi= Xi·$\bar{Y}$i+ $\bar{X}$i· Yi, that requires both input polarities which is in itself, a disadvantage) and Gi= Xi· Yi. For False input signals, these functions are respectively $\bar{P}$i= $\bar{X}$ i·$\bar{Y}$i and $\bar{G}$i= $\bar{X}$i·$\bar{Y}$i. The terms Gi and Pi maintain the relation Gi+ Pi= 1.

Xi and Yi are the i-th bit of two N-bits operands [X] and [Y]. (+) and (·) are respectively representing the OR and the AND combinations.

The carry-Propagate Pi= Xi+ Yi is characterized in that it includes the carry-Generate signal Gi= Xi· Yi. Also, $\bar{X}$i+ $\bar{Y}$i includes $\bar{X}i \cdot \bar{Y}i$. Based on this feature, the carry-Propagate (P) term will hereinafter be referred to as a carry-Integrate (I) term, as it includes the carry-Generate signal (information) with the carry-Propagate signal (information). (in other words, a redundant term Gi is included in the Pi term).

The same idea is carried on further in the succeeding levels of the carry system, where the Generate and the Propagate terms are functions of two bits i+1 and i (partitioning of 2):

$$G(i + 1,i) = G(i + i) + P(i + 1) \cdot G(i) \quad \text{(Eq. 5a)}$$

$$P(i + 1,i) = P(i + 1) \cdot P(i) = \prod_{\alpha=i}^{i+1} P\alpha \quad \text{(Eq. 5b)}$$

where a redundant (underlined) term G(i+1, i) is deliberately included in the P(i+1, i) function:

$$P(i + 1,i) = \underline{G(i + 1,i)} + P(i + 1) \cdot P(i) =$$

$$= \{\underline{G(i + 1) + P(i + 1) \cdot G(i)}\} + P(i + 1) \cdot P(i) =$$

$$= G(i + 1) + P(i + 1) \cdot \{G(i) + P(i)\} = G(i + 1) + P(i + 1) \cdot P(i)$$

giving the carry-Integrate term I(i+1,1) for two bits which replace the two bits P(i+1,i) term;

$$I(i+1, i)=\{P(i+1, i)\}= G(i+1)+P(i+1) \cdot P(i) \quad \text{(Eq. 5c)}$$

Eq. 5a and Eq. 5c provides, in accordance with the principles of the present invention, a novel matched TWIN Generate and Integrate signal function pair for 2-bits (True logic sense) having the relation $\bar{G}(i+1, i) + I(i+1, i) = 1$. Similar is with:

$$\bar{G}(i+1, i) = \underline{\bar{G}(i+i)} \cdot \bar{P}(i+1) + \overline{G(i+1)} \cdot \bar{G}(i)$$

where the term $\underline{\bar{G}(i+1)}$ in the first product is redundant, thus:

$$\bar{G}(i+1, i) = \bar{P}(i+1) + \overline{G(i+1)} \cdot \bar{G}(i) \quad \text{(Eq. 5d)}$$

and the inverse of I (i+1, i ) is:

$$\bar{I}(i+1, i) = \underline{\bar{G}(i+i)} \cdot \bar{P}(i+1) + \overline{G(i+1)} \cdot \bar{P}(i),$$

where the term $\underline{\bar{G}(i+1)}$ in the first product is redundant, thus:

$$\bar{I}(i+1, i) = \bar{P}(i+1) + \overline{G(i+1)} \cdot \bar{P}(i) \quad \text{(Eq. 5e)}$$

Eq. 5d and Eq. 5e provides the novel matched TWIN Generate and Integrate signal function pair for 2-bits (False logic sense).

Eqs. 5a, 5c, 5d and 5e indicates that the TWIN, True and False, Generate and Integrate signal pairs, can be produced by the same AND-NOR gate combination, which is the same gate construction as for the carry signal over one bit (i+1):

$$C(i+2)= G(i+1)+ P(i+1) \cdot C(i+1) \quad \text{(Eq. 5f)}$$

or, $$\overline{C(i+2)}=\overline{G(i+1)} \cdot \bar{P}(i+1)+ \overline{G(i+1)} \cdot \bar{C}(i+1)$$

where the term $\overline{G(i+1)}$ in the first product is redundant, thus:

$$\bar{C}(i+2)= \bar{P}(i+1)+ \overline{G(i+1)} \cdot \bar{C}(i+1) \quad \text{(Eq. 5g)}$$

The Cin(i+1) signal may be replaced by $\bar{C}$ in(i+1) giving the $\bar{C}$out(i+2) signal expression or vice versa.

Inverting Eqs. 5a, 5c, 5d, 5e, 5f and 5g provides the True and False Generate and Integrate signals which are produced by the same OR-NAND gate, all of which are referred to herein as Binary gates, and similarly, a Binary gate pair comprises a Binary cell which implements the matched TWIN Generate and Integrate signal function pair and the Carry signal function pair.

By having the pre-existing relationship condition that V includes U (P includes G or B includes A), it is shown that;

$$\overline{U+V \cdot W} = \overline{V} = \overline{U} \cdot \overline{W} \text{ and } \overline{V \cdot (U+W)} = \overline{U} \cdot (+\overline{W})$$

and, to the best of the inventor's judgement and understanding, these conditional equation relationships, due to their symmetrical structure and practical benefit as a logical tool which leads to a "break through" in handling logic, are claimed by the inventor as theorems in the form of novel logic elements.

A similar result is achieved with a bunch of bits β, where Gβ are deliberately included in the carry propagate Pβ terms which becomes the novel carry Integrate (Iβ) terms.

In U.S. Pat. No. 3,805,045 to Larsen, such negative redundancy terms $\bar{P}\beta$ are used differently {not as matched TWIN signal pairs, see text Column 2, Line 47}.

The Generate and the novel Integrate signal functions are the matched TWIN signal function pair which replace the prior art Generate Gβ (or $\bar{G}\beta$) and the Propagate πPβ (or ΣPβ) signals.

Accordingly, by utilizing the same basic AND-NOR gates pair, defining the Cell, the following general forms of the TWIN signal expressions are implemented: (The symbol ¥ represents an inversion, and α= [i+2{e−}, (i+1)], β= [i+2{e}, (i+1)+2{e−1}], τ= [i+2{e} , (i+1)], δ= [(i+1)+ 2{e}] and σ= [(i+1)+2{e−1}] representation is for fully regular carry system where e represents the level of the carry system, e≧ 1. {e−1} represents the power of e−1. Alternatively, β - represents a bunch of bits j to i+1, β - represents a bunch of bits k to j+1, τ - represents a bunch of bits k to i+1, σ= i+1 and δ= k+1, where k> j> i) for partly regular (partitioned) carry system. For True input signals: Gτ¥Gβ+ Iβ·Gα and Iτ¥Gβ+Iβ·Iα. For False input signals: Iτ¥Iβ+ Gβ·Iα and Gτ¥Iβ+Gβ·Gα. The general form of the carry signal expressions is given by: For True input signals: Cδ¥Gβ+Iβ·Cσ. For False input signals: Cδ¥Iβ+Gβ·Cσ.

Alternatively, by utilizing the same basic OR-NAND gate pair, defining the cell, the following general form TWIN signal expressions are implemented:

$$\bar{G}\tau¥I\beta \cdot (G\beta+G\alpha), \bar{I}\tau¥I\beta \cdot (G\beta+G\alpha)$$

$$\bar{I}\tau¥\bar{G}\beta \cdot (\bar{I}\beta+\bar{I}\alpha), \bar{G}\tau¥\bar{G}\beta \cdot (\bar{I}\beta+\bar{G}\alpha)$$

The general form of the carry signal expressions is given by:

$$\bar{C}\delta¥I\beta \cdot (G\beta+C\sigma),$$

$$\bar{C}\delta¥\bar{G}\beta \cdot (\bar{I}\beta+\bar{C}\sigma),$$

The defined cells are based on the partitioning choice as well as on the logic expression of the gate. These novel cells are used in an expanded interlaced interconnection form implementing an Expanded Interlaced Carry system (EIC-system), with the same partitioning choice.

The design of CMOS gates is affected and can be modified wherever the IMPLY relationship is involved in logic functions. The novelty is characterized in the embodiment of gates, featuring symmetrical structure of switching pairs and crosswise (anti-symmetrical) wiring actuating these pairs (SAS gates), where pairs of gates are not fed by a common input signal, rather they are fed by a pair of signals having the IMPLY relationship. These relations lead to a special family of gates which are useful for the design of carry systems and are also independently adaptable for other specific logic functions including gates having the Tri-State feature, represented herein as an example, by bit-sum cells or devices and by an arithmetic ZERO detection circuit.

ADVANTAGES OF THE PRESENT INVENTION

In accordance with the principles of the present invention, the same pairs of signal expressions (forms), enable the use of the same logical cells, for either True or False input signal polarities.

The Expanded Interlaced Carry system utilizes the same logical cells as building blocks for the pairs of Generate and Integrate (Propagate) terms and the Carry, Not-Carry terms.

Only one logical inverting level (AND-NOR or OR-NAND gates) of the same logical cells is required for each additional carry level (rather than two logical levels as for CLA).

At the final carry level using NOR-NOR gates, both polarities of the carry signals are available for the sum level rather than with additional inversion level.

The number of fanouts at either of the sequential carry levels are constant (rather than being doubled as for the binary tree, recurrence solvers carry system).

The fanout of the most loaded signal at the worst case signal path is reduced by one as compared to groups of prior art.

Both outputs of a complementary output technology are effectively used for reducing highly loaded fanouts.

The design of a carry system with VLSI technology is simplified in general using CAD tools, library cells, gate arrays for ASIC etc. Wiring and building blocks are well organized and evenly distributed over a semi-conductor layer. Therefore, the carry system can perfectly be optimized (a very important feature for designing with VLSI), reducing time consuming testing and providing economical manufacturing quality and reliability control.

Implementation of a comparator is simplified, giving output signal flags [X]= [Y], [X] > [Y] and [X] < [Y] prior to having the data output, thus improving the performance.

Implementation of the skip carry technique with the C-MOS technology provides a modified conflict-free bypass skip gate, see Sato reference (Background).

In addition, Tri-State conditions are accepted without additional delays through the critical signal path of a carry system.

Simulations that have been recently performed in accordance with the principles of the invention, implemented with 1 micron VLSI CMOS technology and using minimum size library cells, yielded an execution time for a worst case signal path (input data X and Y to final output sum), of 7.03 nanoseconds for an 8-bit adder, and 8.09 nanoseconds for a 16-bit adder.

As generally set forth herein the present invention has different impact on various different techniques and technologies used to construct logic circuits and systems.

BRIEF DESCRIPTION OF THE DRAWINGS

Reference is made to the accompanying drawings and table for a better understanding of the present invention, in which:

FIGS. 9*a* and 9*c* (Table 1), illustrate as an example, a schematic of logic symbols implementing an 8-bit adder using the Binary EIC-system as in FIG. 8*b* with the BIC-cells of FIG. 1*d*, where Zone A in Table i represents the implemented signal function pairs according to the present invention;

DETAILED DESCRIPTION OF THE DRAWINGS AND PREFERRED EMBODIMENTS

Figures 1A, 1B:
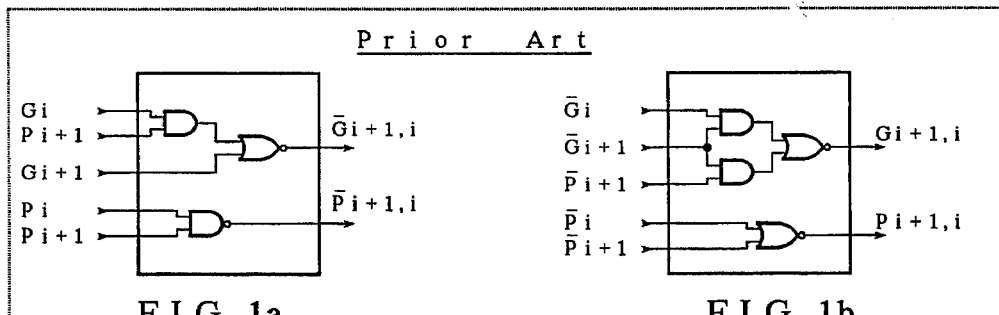
FIG. 1a illustrates a prior art cell, comprising a pair of gates which produces the Generate and Propagate signal pairs for True input polarity.
FIG. 1b illustrates a prior art cell, comprising a pair of gates which produces the Generate and Propagate signal pairs for False input polarity; .
Figures 1C, 1E:
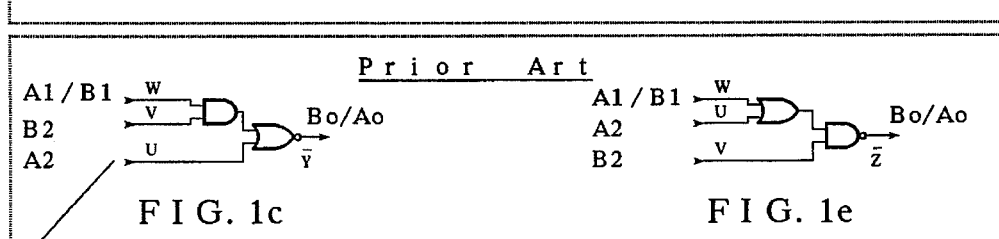
FIG. 1c illustrates a logic symbol of a conventional inherently inverting AND-NOR gate referred to herein as a Binary Inverting Gate.
FIG. 1e illustrates a logic symbol of a conventional inherently inverting OR-NAND gate also referred to herein as a Binary Inverting Gate.
Figures 1D, 1F:
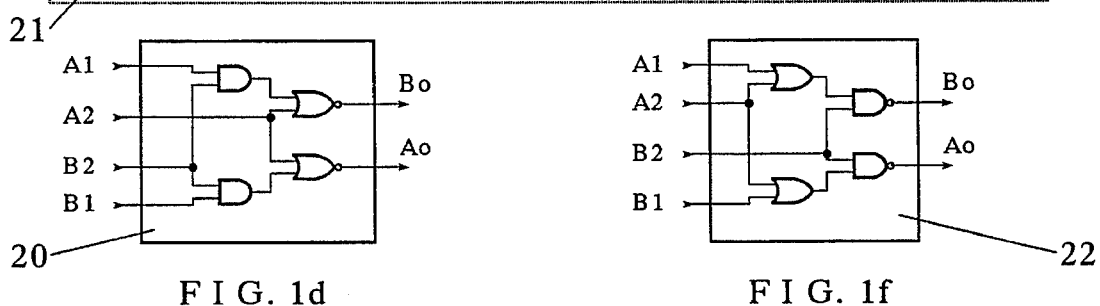
FIG. 1d illustrates, in accordance with the present invention, a logic schematic of a pair of logic symbols given in FIG. 1c referred to herein as a Binary Inverting Carry cell (BIC-cell) having two input pairs, for implementing a novel twin Generate and Integrate output signal pair, with the twin output signal pair providing a predetermined logic relationship.
FIG. 1f illustrates a logic schematic of a BIC-cell as described in FIG. 1d of a pair of logic symbols as in FIG. 1e.
Figures 2A, 2C:
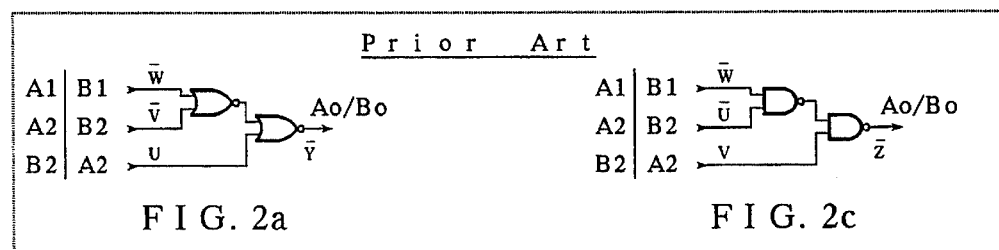
FIG. 2a illustrates a conventionally combined logic schematic of two NOR gate logic symbols referred to herein as a Binary Non-inverting Gate.
FIG. 2c illustrates a conventionally combined logic schematic of two NAND gate logic symbols also referred to herein as a Binary Non-inverting Gate.
Figures 2B, 2D:
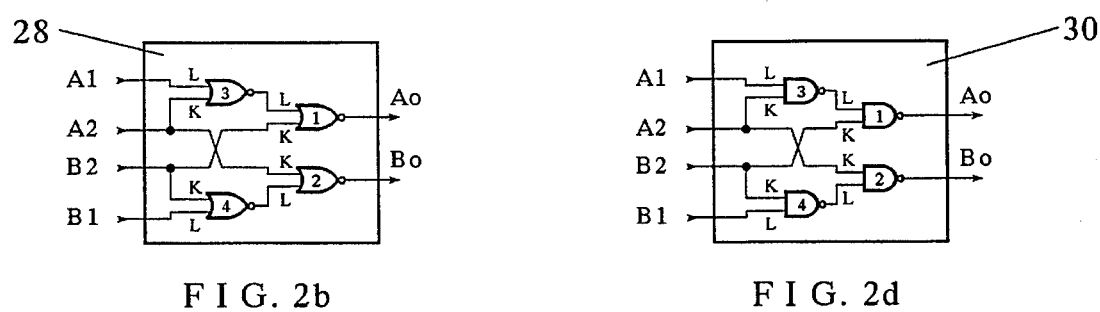
FIG. 2b illustrates a logic schematic, in accordance with the present invention, of a pair of two NOR gate logic symbols as described in FIG. 2a, referred to herein as a Binary Non-inverting Carry cell (BNC-cell) having two input pairs, for implementing a novel twin Generate and Integrate output signal pair, with the twin output signal pair having a predetermined logic relationship.
FIG. 2d illustrates a logic schematic of a BNC-cell as described in FIG. 2b using a pair of schematics as in FIG. 2c.
Figure 8A:
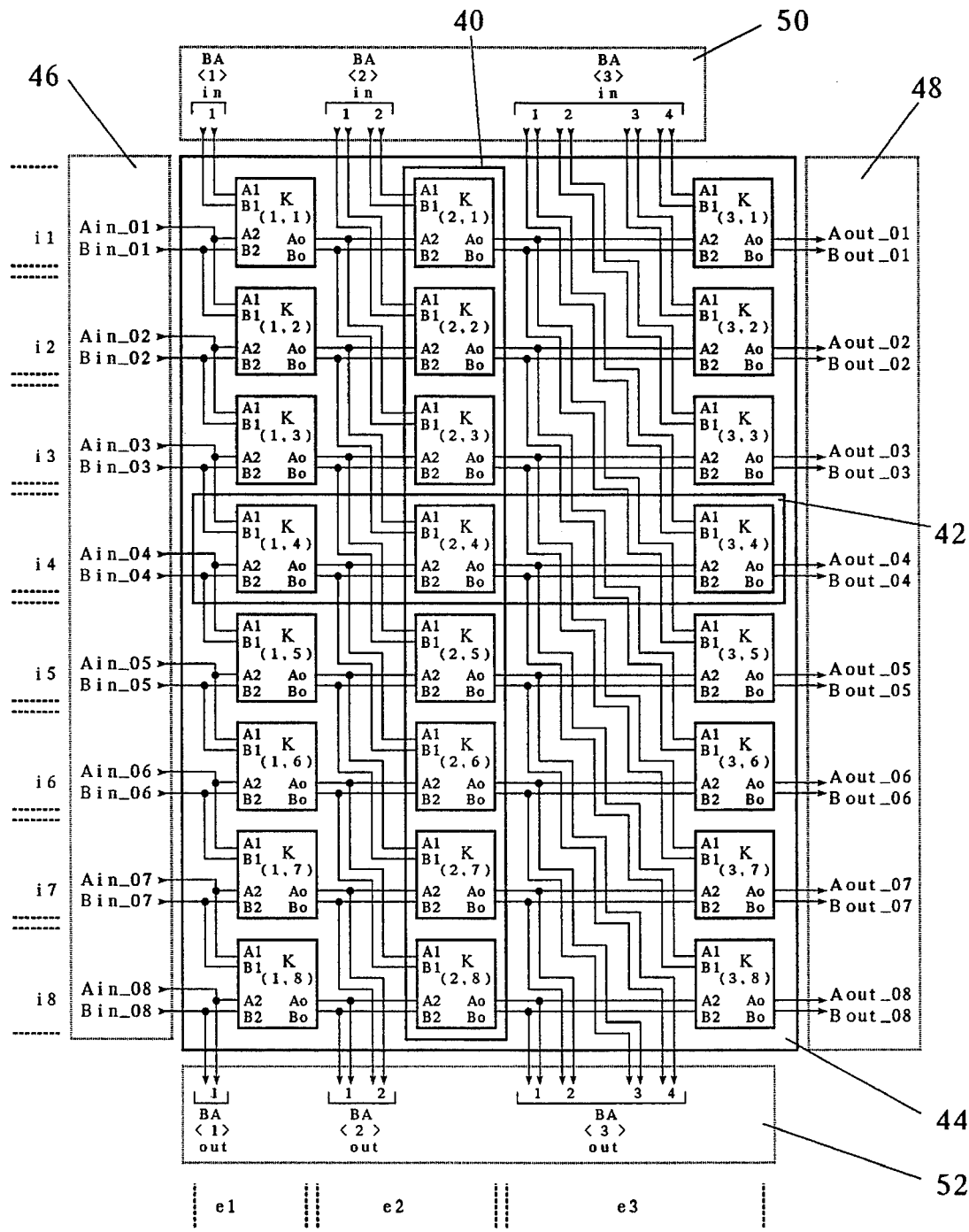
FIG. 8*a* illustrates schematically, a floor-plan layout of a general purpose Binary partitioned Expanded Interlaced array using, in accordance with the present invention, the BIC-cells as described in FIGS. 1*d*, 1*f*, 3*h*, 3*i* or the BNC-cells as described in FIGS. 2*b* and 2*d*.
Figure 8B:
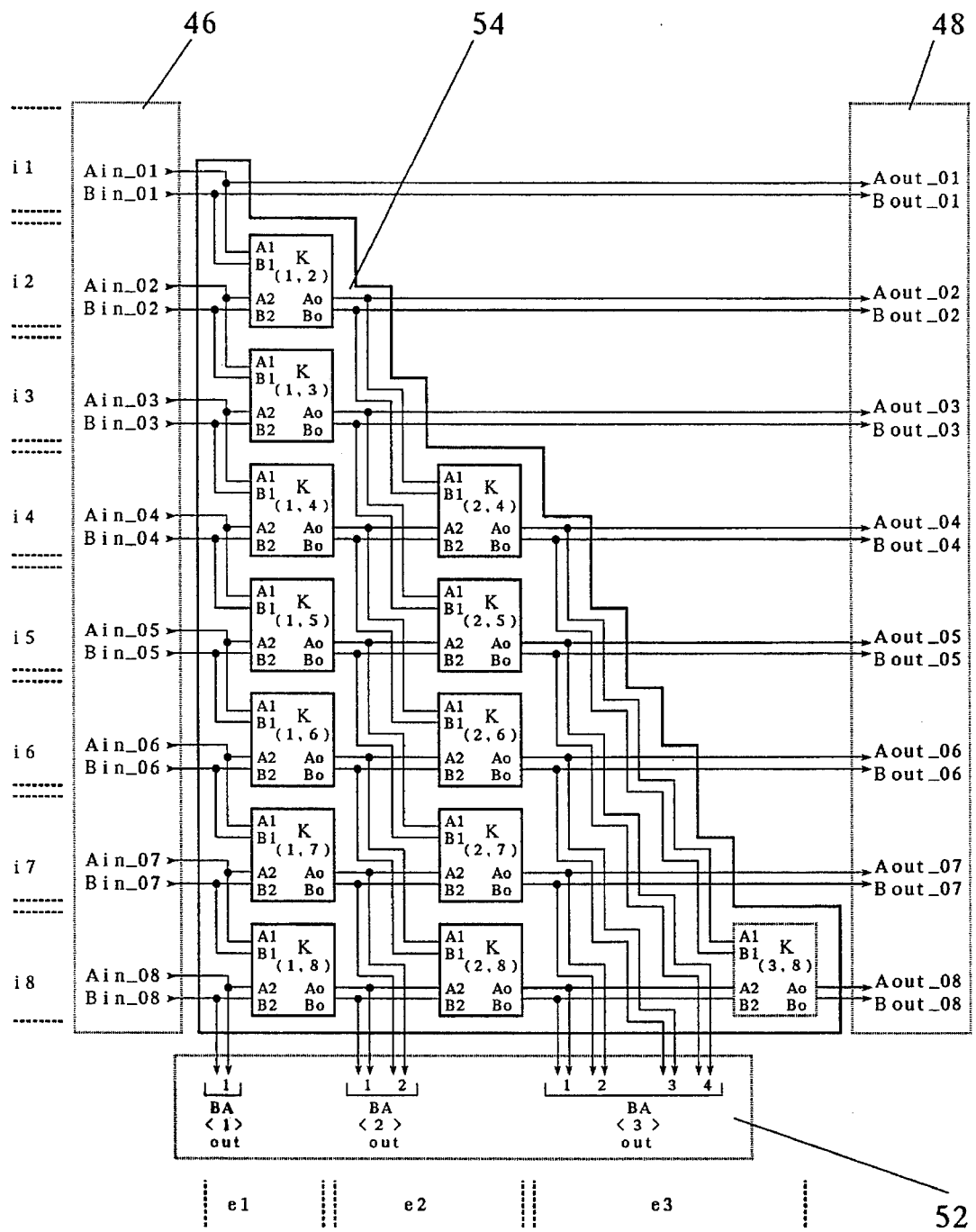
FIG. 8*b* illustrates schematically, a modified floor-plan layout of FIG. 8*a*, used as a Carry system (Binary EIC-system) for an 8-bit adder/subtractor or a comparator.

The following description begins with an introduction of the Binary Cell (BIC-cells) 20, 22, 24 and 26 respectively of FIGS. 1d, 1f, 3h or 3i, or the Binary Cell (BNC-cells) 28 and 30 respectively of FIGS. 2b or 2d which are components of the novel carry systems, each of which can be used as the building blocks K for designing, in accordance with the principles of the present invention, the modified Expanded Interlaced array, as shown in FIG. 8a, implementing the Binary Interlaced Carry systems (Binary EIC-system), as shown in FIG. 8b.

Figure 4A:
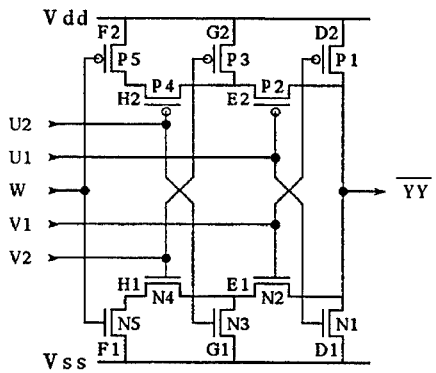
FIGS. 4*a*–4*d* illustrate in accordance with the present invention, a C-MOS technology circuit implementation of logic circuitries, for implementing novel ternary gates referred to herein as Ternary SAS Inverting Gates featuring, as for FIGS. 3*d* and 3*e*, the use of non-conventional gate combinations, used for implementing the ternary Generate and the ternary Integrate output signals.
Figure 4C:
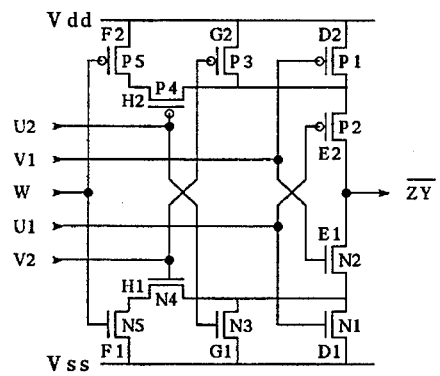
Figure 4B:
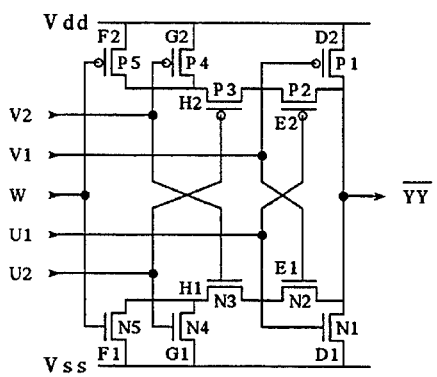
Figure 4D:
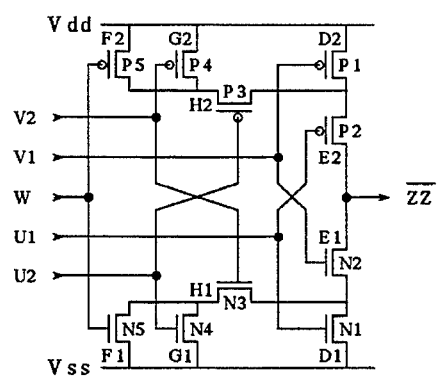
Figure 4E:
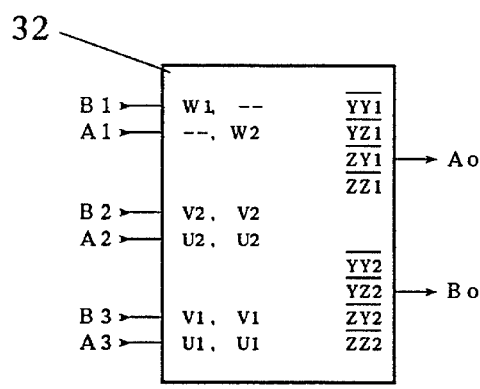
FIG. 4*e* illustrates schematically, in accordance with the present invention, a cell referred to herein as a Ternary Inverting Carry cell (TIC-cell) comprising a pair of ternary inverting gates which are as in FIGS. 4*a*–4*d*, for implementing a twin Generate and Integrate output signal pair, with the twin output signal pair having a predetermined logic relationship.
Figure 7A:
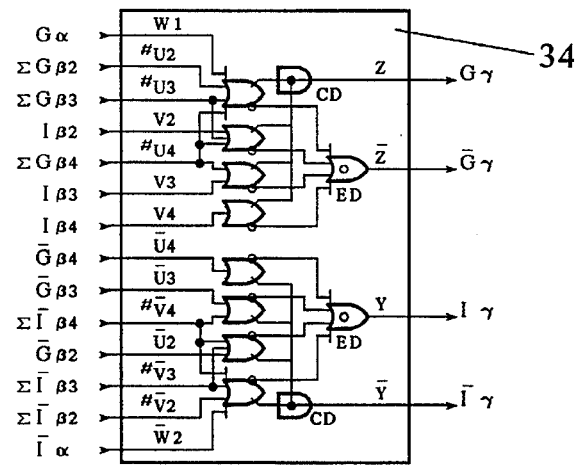
FIG. 7*a* illustrates, in accordance with the present invention, a cell comprising a pair of logic schematics each comprising four OR/NOR gates, each logic schematic combining the WIRED-OR and WIRED-AND outputs for each of the four gates, defining the cell as a Quaternary Complementary Carry cell (QCC-cell), for implementing the quaternary twin Generate and Integrate complementary output signal pair, with the complementary twin output signal pair having a predetermined logic relationship.
Figure 7B:
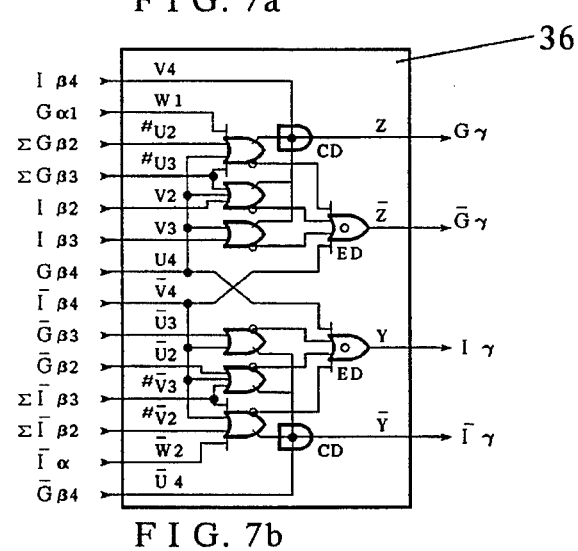
FIG. 7*b* illustrates a QCC-cell as described in FIG. 7*a* where each logic schematic is minimized into three OR/NOR gates.
Figure 7C:
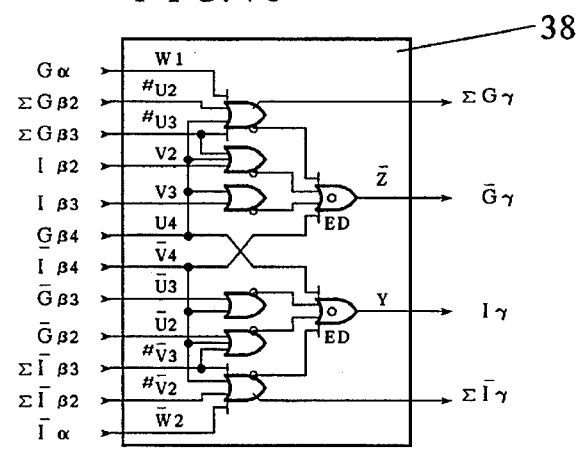
FIG. 7*c* illustrates a Quaternary Carry cell (QC-cell) that differs from the QCC-cell as described in FIG. 7*b* in that the WIRED-AND outputs of the QC-cell are minimized, producing a pair of (Quasi-Sum) signals which are properly used as substitute signals for the quaternary twin Generate and Integrate signals.

The cell 32 of FIG. 4e can be used for a Ternary EIC-system, and the cells 34, 36 or 38 respectively of FIGS. 7a, 7b or 7c can be used for a Complementary Quaternary EIC-system.

The BIC-cell 20 comprises a pair of gates as in FIG. 1c, and implements the logical expressions which are derived from Eqs. 4a and 4b; $Y1¥U+V·W1$ and $\bar{Y}2¥U+V·W2$ or the logical expressions; $Z1¥\bar{V}+\bar{U}·\bar{W1}$ and $Z2¥\bar{V}+\bar{U}·\bar{W2}$.

The BIC-cell 22 comprises a pair of gates as in FIG. 1e, and implements the logical expressions;

$\bar{Y}1¥V·(U+W1)$ and $\bar{Y}2¥V·(U+W2)$ or the logical expressions; $Z1¥\bar{U}·(\bar{V}+\bar{W1})$ and $Z2¥\bar{U}·(\bar{V}=\bar{W2})$,
where $\bar{U}=V1$ and $\bar{W1}=W2=1$, therefore, $Y1+\bar{Y}2=1$ and $\bar{Z}1+Z2=1$. Similar results are achieved with the BNC-cells 28 and 30 respectively, of FIGS. 2b and FIG. 2d.

The modifed Expanded Interlaced array relies on a mathematical method describing binary expansion, indicating that a wiring pattern which corresponds to the appropriate (R-based, Binary, Ternary etc.) cells (elements, nodes) has a regular and uniform layout and interconnecting pattern as shown in FIG. 8a (refer to the paper, "A Parallel Algorithm for the Efficient Solution of a General Class of Recurrence Equations, by P. M. KOGGE et al., IEEE Trans, of Computers Vol. C-22 No. 8, pp. 786–792, Aug. 1973) A specific binary expansion example based on a partitioning number R=2, is shown in FIG. 8b while using prior art cells FIGS. 1a and 1b rather than using the novel BIC-cell 20.

For R= 2, a Binary Interlaced array is constructed. For R= 3, a Ternary interlaced array is constructed, etc.

At FIG. 8a, Cells K as mentioned above, are arrayed at sequential columns 40 (levels e) and crosswise ordered rows 42 (positions i), thus, k(e, i) is a cell at level e and position i. An interlaced pattern can be expanded to any number N of bits (positions i). N is a function of R to the power of L, N= R{L}. The required number of levels is a function of the required number of positions according to L≧ LOG N> (L−1). The terms e, i and r are parameters defining the specific locations or wire connections of each cell in the layout, with the following ranges:

L≧e≧ 1, N≧i≧ 1, R≧ 2 and R> r≧ 1.

Cells K (e, i) accept wire connections from R cells at the preceding level which are located at: [e−1, i−r· R{e−1}] for R> r≧0. Cell K (e, i) delivers wire connections to R cells at the succeeding level which are located at: [e+1, i+r· R{e}] for R> r≧ 0. A set of output wire connections per cell comprises at least one pair and can be more for R≧ 3 or at least four wires for complementary output technology.

FIG. 8a is an example of an interconnections array 44 having eight positions with three logic levels for eight input wire pairs 46 Ain i and Bin i and eight output wire pairs 48 Aout i and Bout i, and additional peripheral input pairs 50, designated A<e>inµ and B<e>inµ. For e= 1 µ= 1, for e= 2 µ= 1 and 2, and for e= 3 µ= 1, 2, 3 and 4.

The peripheral input pairs A<2>in 2 and B<2>in 2, A<3>in 2 and B<3>in 2, A<3>in 3 and B<3>in 3, and A<3>in 4 and B<3>in 4 are redundant for a carry system array FIG. 8b but they are preferably included in the description for showing the regular consistency of the array. Additional peripheral output pairs 52 A<e> outµ and B<e> out u are also redundant but might appear in a design with CAD (computer aided design) tools.

IMPLEMENTATION OF AN 8-BITS ADDER WITH AND-NOR GATES

Figure 9A:
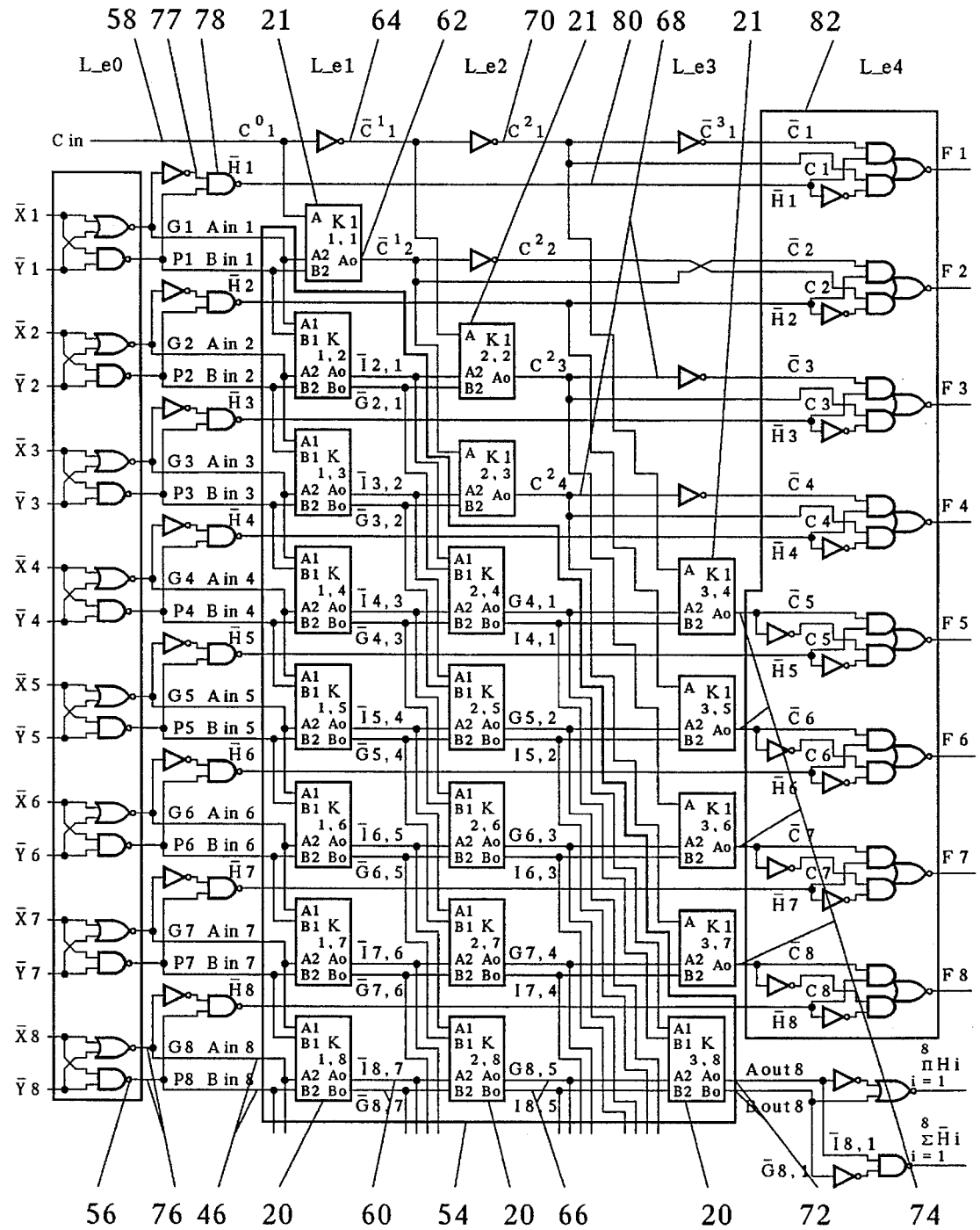

FIGS. 9a and 9c accompanied by Table 1 shows the embodiment of an 8-bit adder utilizing the Expanded Interlaced wiring array 54 of FIG. 8b and the BIC-cells 20 of FIG. 1d as the building blocks K and the cells K1 of FIG. 1c 21. The entire carry system wiring for an 8-bit adder at each block K and Ki can be realized through the use of the logic expressions at each respective rectangular of Table 1.

The twin Gi and Pi(Ii) signal pairs 76, for 8≧i≧1 are respectively connected to the inputs, Ain (i) and Bin (i) 46 of the Binary EIC-system array 54 of FIG. 8b.

With False input signal polarity at the inputs of level 56 (e0), for two 8-bit operands [X] and [Y], where 8≧ i≧ 1, there are produced the twins, one-bit Generate $Gi¥Xi+Yi$ and one-bit Propagate (one-bit Integrate) $Pi¥Xi·Yi¥$ (Ii) signals 76, where ¥ represents an inverting element. Detailed signal expressions are given in column 1 of Table 1.

The carry-in, Cin input signal 58 is designated C<0>1, notice that the subscripts for C and $\bar{C}$ are higher by 1.

Each of the output signals Gi and Pi is respectively connected to two BIC-cells 20 located at level e1 position (Pos.) i, K(1,i) and Pos. i+1, K(1,i+1) producing the twin signal pairs 60 for two bits with respect to Pos. 8≧i≧2 as follows:

the $\bar{G}(8,7)$ and $\bar{I}(8,7)$ twin output signal pair, the $\bar{G}(7,6)$ and $\bar{I}(7,6)$ twin output signal pair, the $\bar{G}(6,5)$ and $\bar{I}(6,5)$ twin output signal pair, the $\bar{G}(5,4)$ and $\bar{I}(5,4)$ twin output signal pair, the $\bar{G}(4,3)$ and $\bar{I}(4,3)$ twin output signal pair, the $\bar{G}(3,2)$ and $\bar{I}(3,2)$ twin output signal pair and the $\bar{G}(2,1)$ and $\bar{I}(2,1)$ twin output signal pair.

and producing at Pos. i=1 the signal $\bar{C}<1>2$ 62 and its inverted signal C<2>2. The C<0>1 signal is inverted, producing the $\bar{C}<1>i$ signal 64. Detailed logic signal expressions are given in Col. 2 of Table 1.

Each of the twin output signal pairs 60 $\bar{G}(i+1,i)$ and $\bar{I}(i+1,i)$ is connected to two respective BIC-cells 20 located at level e2 Pos. i, K(2,i) and Pos. i+2, K(2,i+2) producing the four bit twin output signal pairs 66 with respect to Pos. 8≧i≧4 as follows:

the G(8,5) and I(8,5) twin output signal pair, the G(7,4) and I(7,4) twin output signal pair, the G(6,3) and I(6,3) twin output signal pair, the G(5,2) and I(5,2) twin output signal pair, the G(4,1) and I(4,1) twin output signal pair and with respect to Pos. 3≧i≧2 producing the C<2>3 and C<2>4 68 output carry signals with their inverted signals $\bar{C}<3>3$ and $\bar{C}<3>4$ and inverting the C<2>1 70 carry signal producing the signal $\bar{C}<3>1$. Detailed logical signal expressions are given in Col. 3 of Table 1.

Each of the twin output signal pairs 66 G(i+3,i) and I(i+3,i) is connected to two respective BIC-cells 20 located at level e3 Pos. i, K(3,i) and Pos. i+4, K(3,i+4) producing with respect to Pos. i=8 the twin output signal pair 72 of eight-bits $\bar{G}(8,1)$ and $\bar{I}(8,1)$ and with respect to Pos. $7 \geq i \geq 4$ producing the carry output signals 74 with their respected inverted signals:

the $\bar{C}<3>8$ and C8 output carry signals, the $\bar{C}<3>7$ and C7 output carry signals, the $\bar{C}<3>6$ and C6 output carry signals and the $\bar{C}<3>5$ and C5 output carry signals. Detailed signal expressions are given in Col. 4 of Table 1.

The Gi signals of 76 are inverted, producing the $\bar{G}i$ signals 77, which are inputted into the half-sum gates 78 for producing the function $Hi \yen \bar{G}i \cdot Pi$. The $\bar{H}i$ signals 80 are inverted, producing the Hi signals.

The Ci, $\bar{C}i$ signal pairs and the $\bar{H}i$, Hi signal pairs are connected to the bit-sum cells (F) at the output level 82, producing the bit-sums Fi result, using for $8 \geq i \geq 1$ the signal expressions $Fi \yen Hi \cdot Ci + \bar{H}i \cdot \bar{C}i$ and yielding a full-sum for an 8-bit adder.

The $\bar{G}(8,1)$ signal at (Bout8) and the $\bar{I}(8,1)$ 72 signal at (Aout8) can be used to generate the C9 and $\bar{C}9$ output signal pair, the overflow output signal or being inverted and giving the G(8,1) and I(8,1) signals for further producing the following novel signals:

$$\prod_{\alpha=1}^{8} H\alpha \yen G(8,1) + \bar{I}(8,1), \quad \text{(Eq. 6a)}$$

the PRODUCT of all 8-bits (EXCLUSIVE-OR)

and the signal:

$$\sum_{\alpha=1}^{8} \bar{H}\alpha \yen \bar{G}(8,1) \cdot I(8,1), \text{ the SUM of all 8-bits (EXCLUSIVE-NOR).} \quad \text{(Eq. 6b)}$$

Eq. 6a (or Eq. 6b) indicates that the mantissa in a Floating Point adder can be normalized over eight bits.

Figure 13:
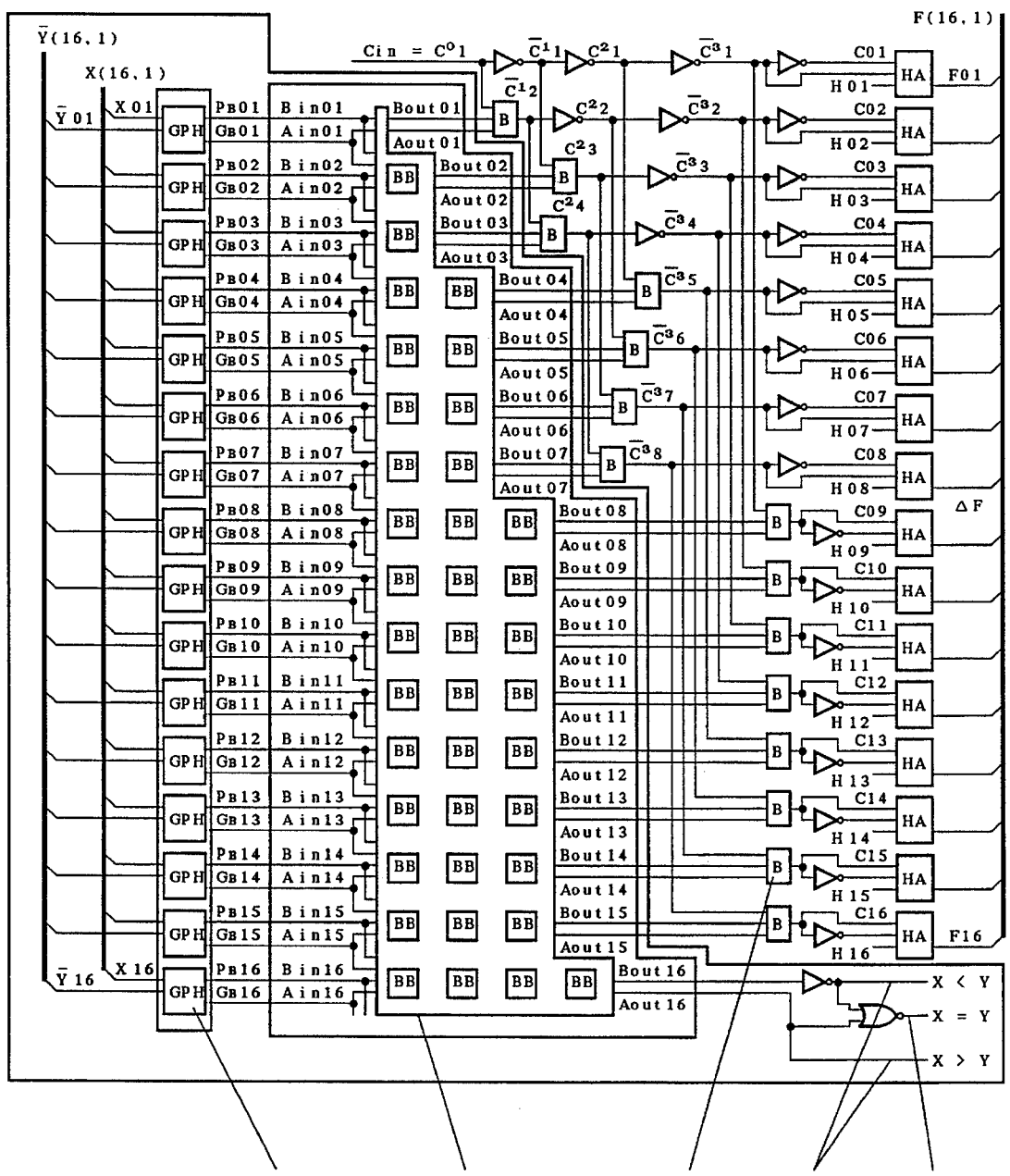
FIG. 13 illustrates in accordance with the present invention, an example of a schematic floor-plan array of a 16-bit comparator including adder/subtractor.

Utilizing the 16-bit adder of FIG. 13 as a comparator by subtraction [X]–[Y], results in the following output signals G(16.1) and I(16.1) 178 respectively to the output ends Aout16 and Bout16 which are capable of indicating whether [Y]>[X] or [X]>[Y] and the output 176 of the expression:

$$^{16}_{\alpha=1}\pi \bar{H}\alpha \yen G(16,1) + \bar{I}(16,1)$$

which indicates the equality [X]=[Y].

The Cells GPHi implements the functions $Gi \yen Xi + Yi$ $Pi \yen Xi + \bar{Y}i$ AND $Hi \yen Gi + Pi$.

The cells B implement the logic circuit of FIG. 1c, the cell HAi implements the function $Fi = Hi \cdot Ci + \bar{H}i \cdot \bar{C}i$ and the cells BB represents the BIC-cells 20.

This example completes an 8-bit adder, representing the principal embodiment of the novel adder/subtractor/comparator yielding a total of less than five (single) units delay and one inverter delay. Further, the fanout loading of the example has a maximum of four fanouts at the initial Gi and Pi signals and maximum three fanout at either level of the Binary EIC-system, rather than, at least five fanouts at the worst case (critical) signal path propagation delay of plural carry levels, L>3, as with the prior art binary tree.

IMPLEMENTATION OF AN 8-BITS ADDER WITH NOR (or NAND) GATES

Figure 9B:
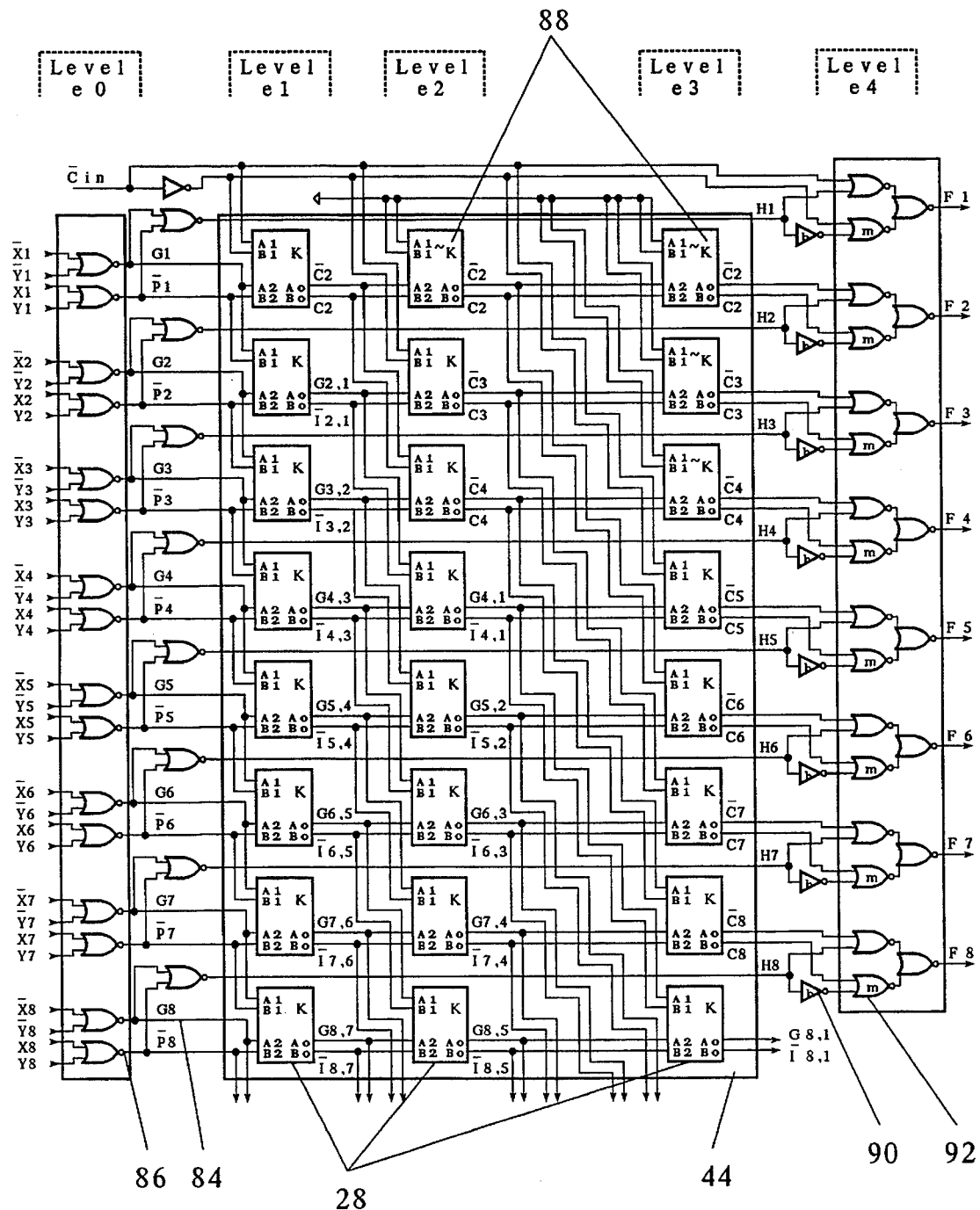
FIG. 9*b* illustrate as an example a schematic circuit of logic symbols implementing the design of an 8-bit adder using the Binary EIC-system as in FIG. 8*a* with the BNC-cells of FIG.

Another way of designing an adder is represented by the schematic circuitry of FIG. 9b using the modified pattern FIG. 8a 44 and utilizing the NOR BNC-cell 28 of FIG. 2b (or alternatively the NAND BNC-cell 30 of FIG. 2d). The Binary EIC-system array accepts True Gi input signals 84 and False $\bar{P}i$ ($\bar{I}i$) input signals 86 [or alternatively Gi, Pi for NAND BNC-cells 30 of FIG. 2d].

The utilization of FIG. 8a for the adder of FIG. 9b indicates a full bit slice regularity and uniformity, However the BNC-cells 28 (or 30) marked $\bar{K}$ 88 are redundant.

The BNC-cells 28 of FIG. 2b, implement the following twin signal pairs;

$$I\tau \yen G\beta + \overline{I\beta + I\alpha} \qquad G\tau \yen \overline{I\beta} + \overline{G\beta + G\alpha}$$

(or alternatively the following twin signal pairs for the BNC-cells 30 of FIG. 2d);

$$\overline{G\tau} \yen I\beta \cdot \overline{\overline{G\beta} \cdot \overline{G\alpha}} \qquad I\tau \yen \overline{G\beta} \cdot \overline{I\beta \cdot I\alpha}$$

The inputs A1 and B1 of cells K(2,1), K(3,1) and K(3,2) may be connected to either LOGIC HIGH or LOGIC LOW.

This example for NOR Gates matches the Gallium-Arsenide technology yielding a total of nine units delay (two inputs NOR gates) with the same maximum fan-outs as in FIG. 9a.

A unique advantage of the design with only NOR gates (or NAND gates) is, that although both polarities are required at either logical level, inverters are not needed and a very regular bit slice and compact design is gained. The example relates to any adder/subtractor having higher bit amount. Notice that the G signals have True polarity and the I signals have False polarity. This is dictated by the use of the NOR gates or inversely by the NAND gates. The inverters (marked b) 90 can be eliminated by replacing the two-input NOR gates (marked m) with three-input NOR gates.

GROUPED CARRY SYSTEM EXAMPLES

Figure 10:
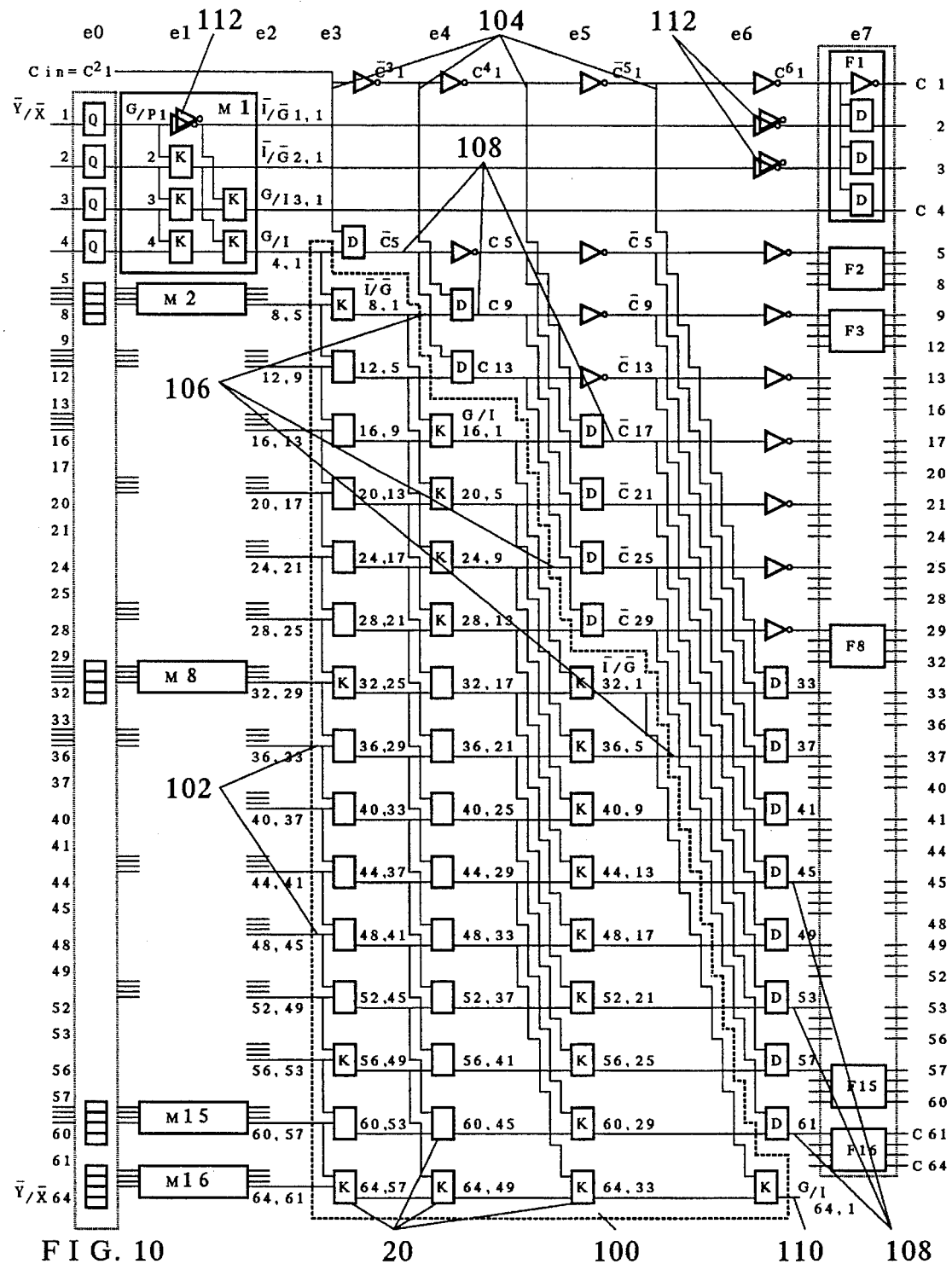
FIG. 10 illustrate a floor-plan layout representing a carry system which interlaces 16 groups of 4-bits into a main four-level Binary EIC-system which provides a carry system for a 64-bit adder.
Figure 11:
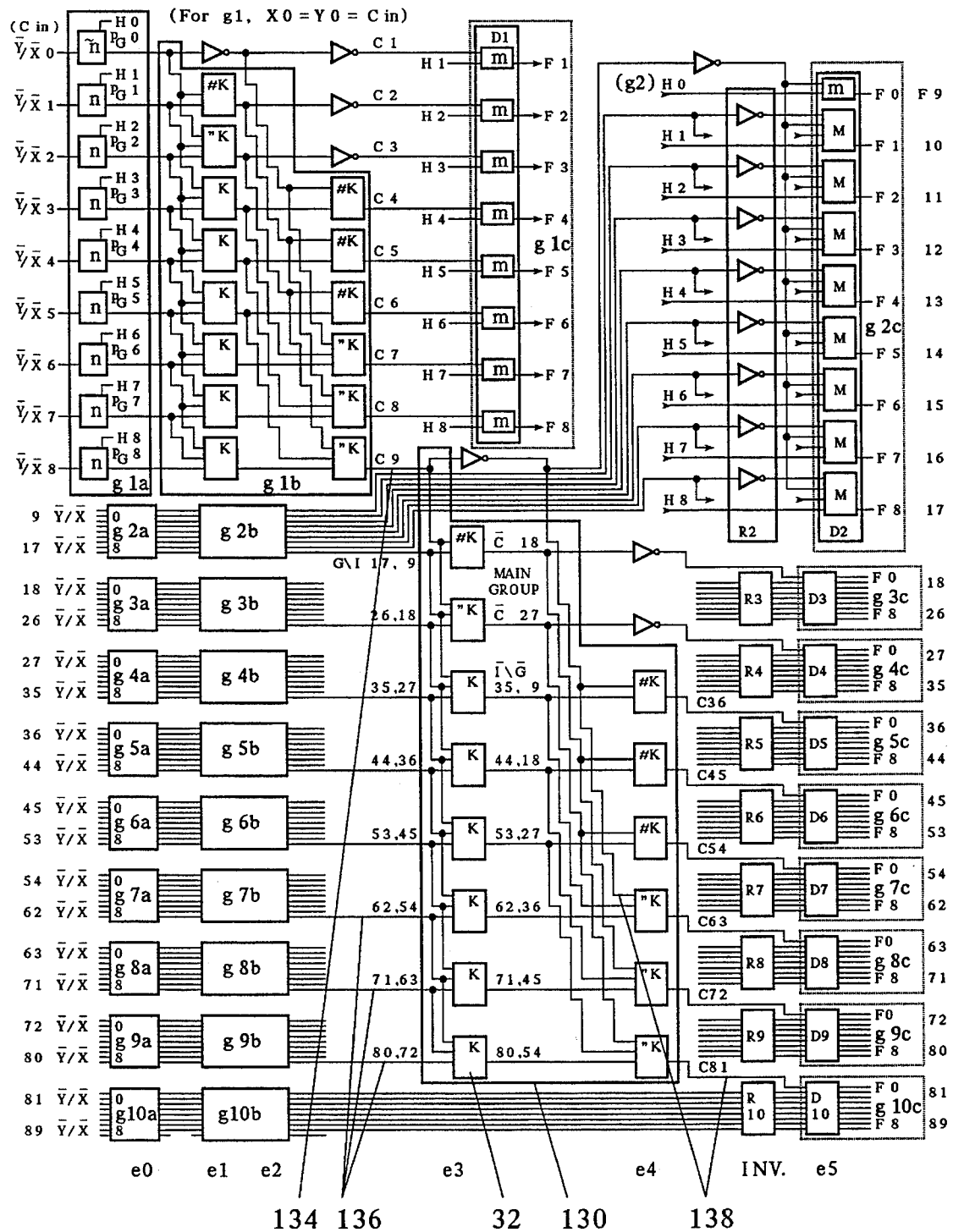
FIG. 11 illustrate a floor-plan layout representing an 89-bit adder without input provision for Cin, which interlaces, ten groups of 9-bits, each with a Ternary partitioning EIC-system into a main two-level Ternary EIC-system.

The following section describes FIG. 10 and FIG. 11 in conjunction with additional preferred embodiments covering different design concepts regarding various selected technologies.

One way for designing a fast (grouped) carry system for a mass of bits is given in FIG. 10 which is a carry system for a 64-bit adder. FIG. 10 include the input level e0 having sixty four input cells Q, sixteen sub-groups Mi of 4-bits comprising levels e1 and e2, one main-group 100 of 16-positions comprising levels e3, e4, e5 and e6, an inverting level and one final level e7. Each sub-group Mi utilize a 4-bits Binary EIC-system array and the main-group 100 utilize a 16-positions Binary EIC-system array.

Rectangles K represent one BIC-cell 20, rectangles D represent the logic circuit of FIG. 1c, rectangles E represent the logic circuit of FIG. 1c and an inverter, rectangles F represent three H rectangles, and rectangles H represent two circuits as per FIG. 1c.

The Q cell of level e0 are organized in four bits per group where there are implemented, the twin output signal pairs G[4(g−1)+i] and P [4(g−1)+i] as a function of the sub-group Mi Pos. $16 \geq g \geq 1$ and the bit-Pos. $4 \geq i \geq 1$ per sub-group.

The twin signal pairs are:

$$G[4(g-1)+i] \yen \bar{X}[4(g-1)+i] + \bar{Y}[4(g-1)+i]$$

and $$\{I[\ldots]\} = P[4(g-1)+i] \yen \bar{X}[4(g-1)+i] \cdot \bar{Y}[4(g-1)+i]$$

The four twin output signal pairs of each sub-group Mi are represented by the signal pair $G[(4(g-1)+i), (4(g-1)+1)]$ and $I[(4(g-1)+i), (4(g-1)+1)]$.

For $3 \geq i \geq 1$, the twin output signal pairs of each sub-group Mi are respectively connected, directly and through inverters, to the H rectangles at the F rectangles at the final carry level e7.

For i=4, the twin output signal pairs $G[4g,4(g-1)+1]$ and $I[4g,4(g-1)+1]$ of each sub-group Mi is connected to the respective input end pair 102 of the main group 100.

The carry-in signal Cin=C<2>1 is serially inverted and connected at the four levels 104 of the main group 100, in the same respective way as in FIG. 9a.

For $15 \geq g \geq 1$, the twin output signals pairs 106 are inputted to the respective D and E cells where they are combined with less significant carry signals for producing at the D and E cells output ends 108 the more significant carry output signals $C(4g+1)$ and their inverted output signal $\bar{C}(4g+1)$.

For g=16, the twin output signal pair 110 is G(64, 1) and I(64, 1).

For $16 \geq g \geq 1$ and i=1, the Carry output signals $C[4(g-1)+1]$ and $\bar{C}[4(g-1)+1]$ are the final carry signal pairs and are directly used for the bit-sum $F[4(g-1)+i]$ (not shown).

For $16 \geq g \geq 1$ and $4 \geq i \geq 2$, the Carry output signals $C[4(g-1)+1]$ and $\bar{C}[4(g-1)+1]$ are respectively combined to the respective H rectangle at the respective rectangle F with the respective signal pair of the three twin output signal pairs from the respective groups 102 and inverters 112 producing thereby the final carry signal pairs according to the following carry signal function pair:

$$\bar{C}[4(g-1)+i] \yen G[(4(g-1)+(i-1)), (4(g-1)+1)] + + I[(4(g-1)+(i-1)), (4(g-1)+1)] \cdot C(4g+1)$$

and $$C[4(g-1)+i] \yen \bar{I}[(4(g-1)+(i-1)), (4(g-1)+1)] + + \bar{G}[(4(g-1)+(i-1)), (4(g-1)+1)] \cdot \bar{C}(4g+1).$$

These carry signal function pairs are further combined at the respective bit-sum cells (not shown), $F[4(g-1)+i]$.

This fast carry system comprising Binary Grouped Binary EIC-systems and referred to as BGB EIC-system, yields a 64-Pos. carry system having seven units delay+inverter delay level e0) rather than eleven units delay+inverters as with the carry look ahead system.

The max. fanout at the main Binary EIC-system outputs is four (adjacent loads). The total amount of carry cells is 355 AND-NOR gates of FIG. 1c+119 inverters.

The BGB-system uses 13½ elements (gates and inverters) per bit adder.

One further way of designing a fast (grouped) carry system adder for a mass of bits is by using the Ternary inverting gates having the following typical AND-NOR logical expression;

$$\bar{Y} \yen U2 + V2 \cdot U1 + V2 \cdot V1 \cdot W$$

for implementing the following matched twin signal function pair:

$$\bar{G}(l-1,i) \yen G(l-1,k) + I(l-1,k) \cdot G(k-1,j) + I(l-1,k) \cdot I(k-1,j) \cdot G(j-1,i)$$

and $$\bar{I}(l-1,i) \yen G(l-1,k) + I(l-1,k) \cdot G(k-1,j) + I(l-1,k) \cdot I(k-1,j) \cdot I(j-1,i)$$

or having the following typical OR-NAND logical expression:

$$\bar{Z} \yen V2 \cdot (U2+V1) \cdot (U2+U1+W)$$

for implementing typical respective matched twin signal function pairs where l, k, j and i represent bit positions. $l>k>j>i$.

FIG. 11 is a schematic floor-plan of an 89-bit Adder, with Cin. FIG. 11 is composed of one main group 130 and ten subgroups 132 each having 9-bit positions (i). Rectangles marked K represents one Ternary cell 32 as FIG. 4e, rectangle marked ⁻K represents one Ternary gate as FIG. 4a and inverter, rectangle marked ⁻K1 represents one Ternary gate as FIG. 4a, rectangle marked #K represents one Binary gate as FIG. 1c and inverter, rectangle marked #K1 represents one Binary gate as FIG. 1c and rectangle marked M represents an extended bit sum cell as FIG. 5c.

At level e0, for $10 \geq g \geq 1$ and $8 \geq i \geq 0$ and except for g=1 and i=0, the bit positions are defined by using the subscript $[9(g-1)+i]$. As shown in group g1a, there are logic devices marked n where the Gi and Pi input signal pairs and the half-sum signal Hi (using the expression $Hi \yen Gi \cdot Pi$) are produced. The input signal pairs are:

$$G[9(g-1)+i] \yen \bar{X}[9(g-1)+i] + \bar{Y}[9(g-1)+i]$$

and $$P[\ldots] = I[9(g-1)+i] \yen \bar{X}[9(g-1)+i] \cdot \bar{Y}[9(g-1)+i]$$

The nine output signal pairs produced at each group gia are $G[9(g-1)+i,9(g-1)]$ and $I[9(g-1)+i,9(g-1)]$ except for group g1a.

The output signal pairs for $10 \geq g \geq 2$ and $7 \geq i \geq 0$ are $G[9(g-1)+i,9(g-1)]$ and $I[9(g-1)+i,9(g-1)]$ which are directly connected to the extended bit-sum cells marked M at the sum level marked D and through an inversion level marked R, producing the inverted matched twin output signal pairs $\bar{G}[9(g-1)+i,9(g-1)]$ and $\bar{I}[9(g-1)+i,9(g-1)]$ which are also connected to the extended bit-sum cells M at the sum level marked Di.

For g=1 and $7 \geq i \geq 0$, there are produced the carry signals $C[9(g-1)+(i+1)]$ and their inverted $\bar{C}[9(g-1)+(i+1)]$ signals which are respectively connected to the bit-sum cells marked m at the sum level Di.

For g=1 and i=8 the output signal is the grouped carry signal C<2>9 134.

For $10 \geq g \geq 2$ and i=8 the matched twin output signal pair of each group gia is $G[9g-1,9(g-1)]$ and $I[9g-1,9(g-1)]$ 136 which are connected to the respective input end pair positions of the main Ternary EIC-system array 130 producing the matched twin output signal pairs at the output end 138 as follows: the G[17,9] and I[17,9] signals are combined with the C<2>9 signal, producing the $\bar{C}$<3>18 which is then inverted, and combining G[26,18], I[26,18], G[17,9], I[17,9] and C<2>9 signals for producing the C<3>27 signal which is then inverted, and combining G[17,9], I[17,9], G[26,18], I[26,18], G[35,27] and I[35,27] signals for producing the twin output signals $\bar{I}$[35,9] and $\bar{G}$[35,9] which are further combined at the next level with the carry signal $\bar{C}$<3>9 and producing the carry signal C<4>36 which is then inverted, and combining G[26,18], I[26,18], G[35,27], I[35,27], G[44, 36] and I[44,36] signals for producing the twin output signals $\bar{I}$[44,18] and $\bar{G}$[44,18] which are further combined at the next level with the carry signal $\bar{C}$<3>18 and producing the carry signal C<4>45 which is then inverted, and combining G[35,27], I[35,27], G[44,36], I[44,36], G[53,45] and I[53,45] signals for producing the twin output signals $\bar{I}$[53, 27] and $\bar{I}$[53,27] which are further combined at the next level with the carry signal $\bar{C}$<3>27 and producing the carry signal C<4>54 which is then inverted, and combining G[44,36], I[44,36], G[53,45], I[53,45], G[62,54] and I[62,54] signals for producing the twin output signals Ī[62,36] and Ḡ[62,36] which are further combined at the next level with Ī[35,9] and Ḡ[35,9] and the signal C̄<3>9 and producing the carry signal C<4>63 which is then inverted, and combining G[53,45], I[53,45], G[62,54], I[62,54], G[71,63] and I[71,63] signals for producing the twin output signals Ī[71,45] and Ḡ[71,45] which is further combined at the next level with Ī[44,18] and Ḡ[44,18] and the signal C̄<3>18 and producing the carry signal C<4>72 which is then inverted, and combining G[62,54], I[62,54], G[71,63], I[71,63], G[80,72] and I[80,72] signals for producing the twin output signal Ī[80,54] and Ḡ[80,54] which is further combined at the next level with Ī[53,27] and Ḡ[53,27] and the signal C̄<3>27 and producing the carry signal C<4>81 which is then inverted.

The $G[9(g-1)+i]$ signals at level e0 are inverted (not shown in FIG. 11), producing the signals $\bar{G}[9(g-1)+i]$ which are required for producing the Half-sum $\bar{H}[9(g-1)+i]$ signals as follows: $\bar{H}[9(g-1)+i] \mathbf{\yen} G[9(g-1)+i] \cdot P[9(g-1)+i]$.

The $\bar{H}[9(g-1)+i]$ signals are inverted (not shown in FIG. 11) for producing the signal $H[9(g-1)+i]$.

The complete set of signal functions are now available for implementing the final sum result at the sum level.

For $10 \geq g \geq 2$ and $8 \geq i \geq 1$, the bit-sum signals are implemented at the extended bit-sum cells M having the following logical expression; F¥H·G+H·I·C+H̄·Ī+H̄·Ḡ·C̄: [or Alternatively by F¥(H̄+G)·(H̄+I+C)·(H+Ī)·(H+Ḡ+C̄)].

The detailed bit-sum signal expressions are:

$$F[9(g-1) + i+1] \mathbf{\yen} H[9(g-1)+i+1] \cdot G[9(g-1)+i, 9(g-1)] +$$
$$+ H[9(g-1)+i+1] \cdot I[9(g-1)+i, 9(g-1)] \cdot C[9(g-1)] +$$
$$+ \bar{H}[9(g-1)+i+1] \cdot \bar{I}[9(g-1)+i, 9(g-1)] +$$
$$+ \bar{H}[9(g-1)+i+1] \cdot \bar{G}[9(g-1)+i, 9(g-1)] \cdot \bar{C}[9(g-1)].$$

For $g=1$ at $8 \geq i \geq 1$ and for $i=0$ at each of groups $10 \geq g \geq 2$, the bit-sum signals are implemented by prior art cells (marked m) using the logical expression F¥H·C+H̄·C̄ [or alternatively by F¥(H̄+C)·(H+C̄)] where the signal combinations are obvious.

The Ternary-Grouped Ternary EIC-system (TGT EIC-system) of FIG. 11 yields an 89-bit adder having six logic levels+inv. including the input and the sum level giving six TIC-cells+inv. units delay (buffers, if required, are not included). It includes also one additional inversion level which doesn't affect the worst case signal path propagation delay of the adder. For MOS-technologies, the maximum fanout loading at the output of level e0, the initial Pi and Gi signals, is six, and this can be reduced to five. The maximum fanout loading at either carry level is five and can be reduced to four. The maximum fanout loading at the outputs of the main Ternary EIC-system is nine. The average amount of logical elements per bit (including inverters) is 11.

A 32-bit adder can be constructed by using an input logic level, eight sub-groups of 4-bits having two levels Binary Expanded Interlaced Carry system and one main group having three levels Binary expanded carry system and a final sum level using extended bit-sum devices resulting in a reduced amount of components.

One further example of a Grouped EIC-system which provides flexible partitioning and optimized adder dimensions can be constructed by mixing Binary and Ternary EIC-systems, e.g. for multiplication, by implementing a Carry Assimilate Adder (CAA). This design uses 4-bit groups, either as a single level Quatenary groups (Q-groups) or as a two levels Binary groups. The Q-groups comprise one Quatenary carry cell (QC-cell) and additional gate pairs, in which the output end pairs of the QC-cells of each of the Q-groups are connected to the input end pairs of a sub-main EIC-system based on any partitioning number.

For example, a combination of one main group Binary EIC-system (based on R=2 and L=2) and four sub-main groups Ternary EIC-system (based on R=3 and L=2), can be implemented as a carry system for 36 Q-groups providing a 144-bit adder that can function for multiplication of 108-bits in a CAA mode, while decoding 3-bits per cycle. Grouping of groups as in this example requires two additional logical levels for the carry system or one logical level and extended bit-sum cell. Longer wires have less fanouts.

A carry system can be designed with sub-groups of bits, where each group may have 2, 3, 4, etc. bits connected to EIC-systems, as long as the input pair Generate and Integrate terms at the main carry system maintains the relation Gg+Ig=1.

ADDER IMPLEMENTATION WITH COMPLEMENTARY OUTPUTS TECHNOLOGIES

An example for constructing an adder with a technology having complementary outputs is described by FIGS. 6, 7, and 12.

Figure 12A:
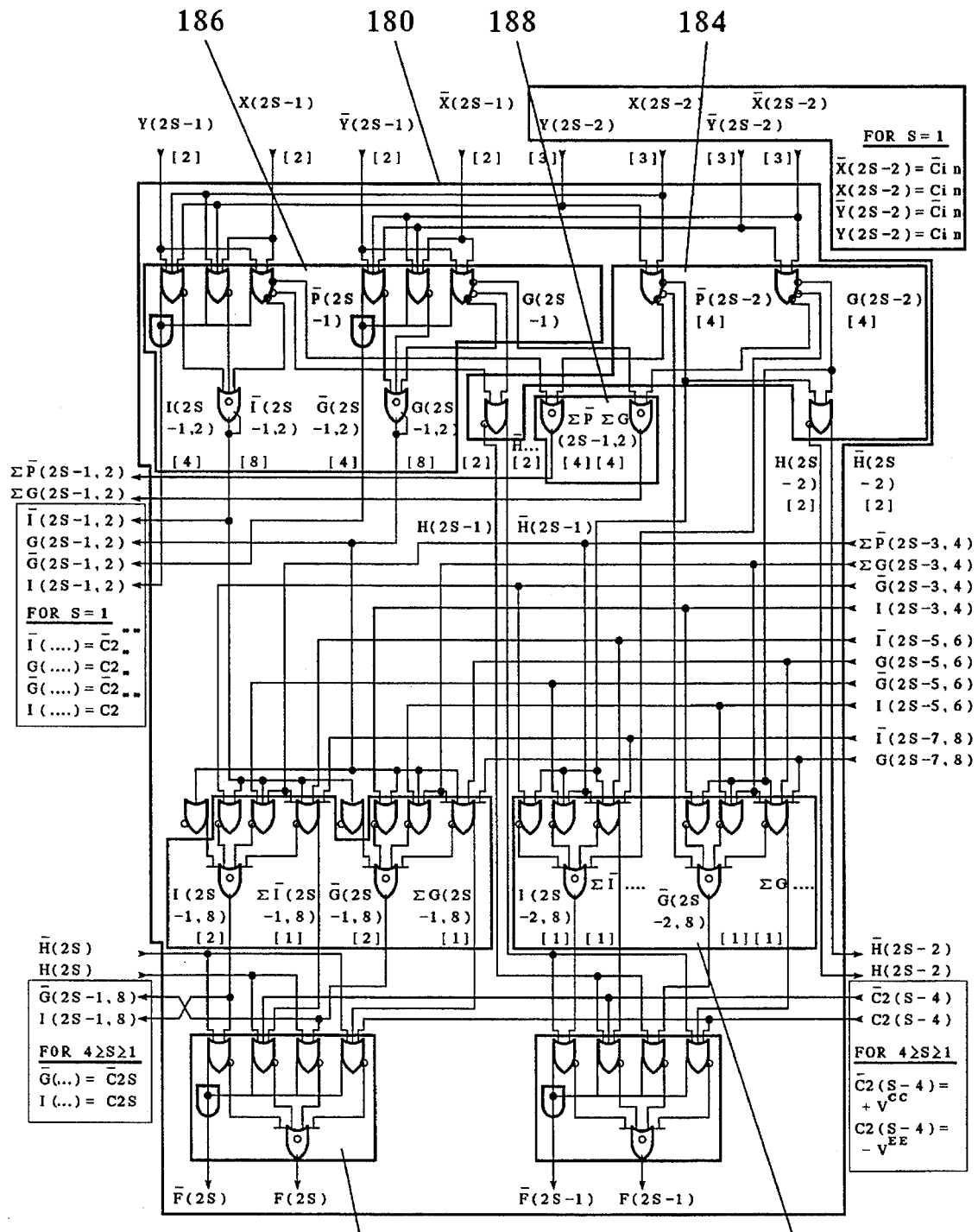
FIG. 12*a* illustrates as an example, in accordance with the present invention, a schematic circuit of logic symbols implementing the design of a two-bit slice adder.
Figure 12B:
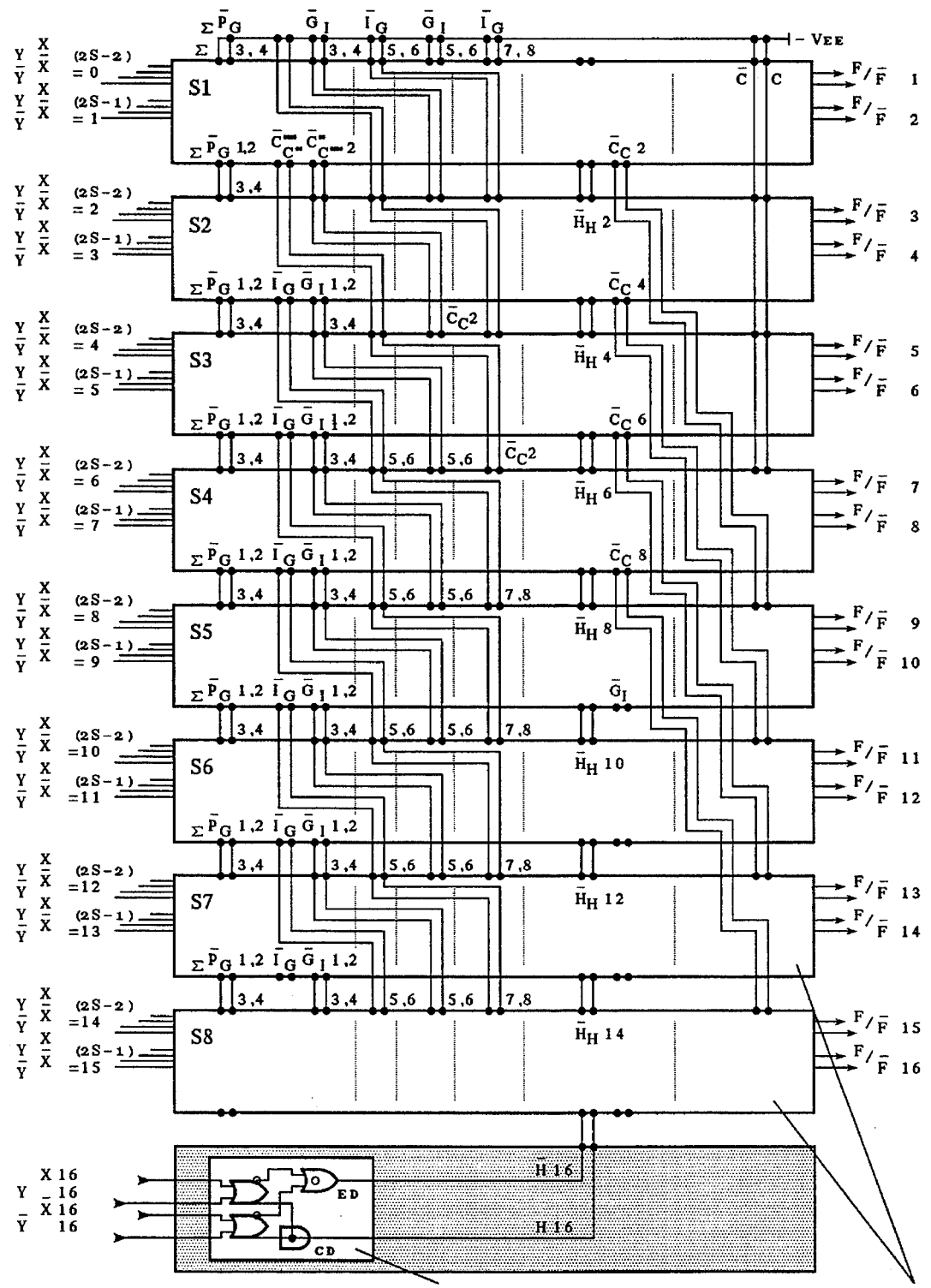
FIG. 12*b* illustrates, a schematic floor-plan array, representing a 16-bits adder array which comprises eight slices as represented by FIG. 12*a*.

FIG. 12a represents a two-bit adder herein referred to as a slice 180(s). Eight of such slices 180 are shown in FIG. 12b, located side-by-side at positions $8 \geq s \geq 1$ and being connected according to their signal subscripts. FIG. 12b shows a 16-bit adder comprising eight slices 180 and additional peripheral circuitry 182 at the most significant side. This adder design yields only three units delay including the input and the sum levels having in general a fanout less than four per output.

Figure 6A:
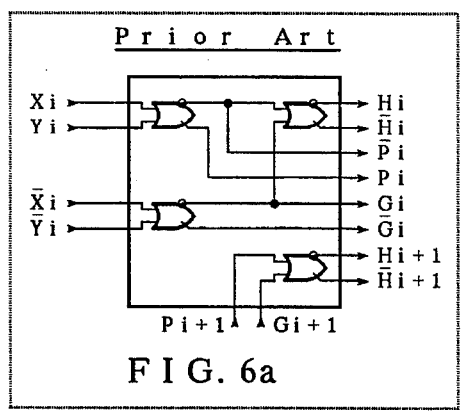
FIG. 6*a* illustrates a prior art Complementary Outputs Logic schematic (COL-schematic), comprising the logic symbols of four OR/NOR gates, producing the complementary outputs of one-bit Generate and one-bit Propagate terms, and the complementary half-sum output signals for each of the two input bits.
Figure 6B:
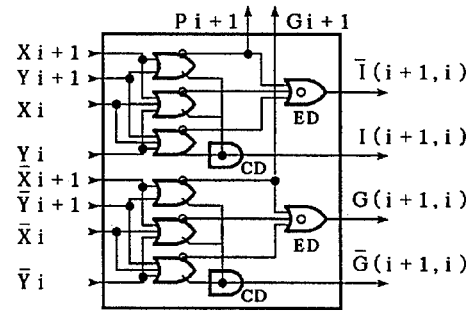
FIG. 6*b* illustrates, in accordance with the present invention, a COL-schematic comprising the logic symbols of six OR/NOR gates combining the WIRED-OR and WIRED-AND logic circuitry of three logic symbols each, for producing the twin two-bit Generate and the two-bit Integrate complementary output signal pair, with the complementary twin output signal pair having a predetermined logic relationship.
Figure 6C:
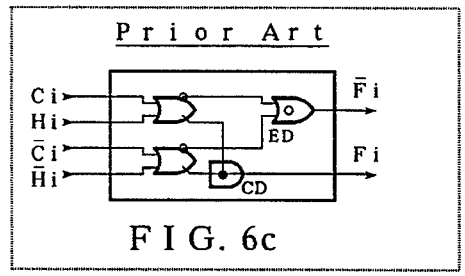
FIG. 6*c* illustrates a prior art COL-schematic comprising the logic symbols of two OR/NOR gates, producing complementary bit-sum F signals.
Figure 6D:
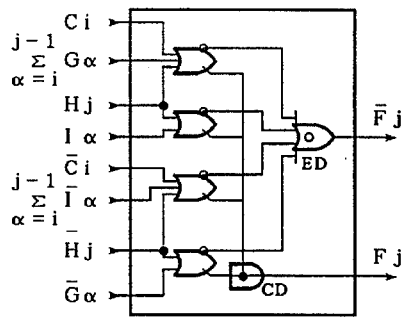
FIG. 6*d* illustrates, in accordance with the present invention, a COL-schematic comprising the logic symbols of four OR/NOR gates, for implementing modified extended bit-sum F signals.

The two-bit slice adder 180 of FIG. 12a comprises one logical circuit 184 as in prior art FIG. 6a, one logical circuit 186 as in FIG. 6b, two ED gates 188, two QC-cells 38 as in FIG. 7c and two extended bit-sum cells 190 as in FIG. 6d.

Both polarities of two bits of two operands are inputs for the two-bit slices, X̄/(2s−2), Ȳ(2s−2), X(2s−2), Y(2s−2), X̄(2s−1), Ȳ(2s−1), X(2s−1) and Y(2s−1). The logical circuit 184 of FIG. 6a implements the i-th bit [i=(2s−i)] carry Generate G(2s−2) and carry Propagate P̄(2s−2) signals and the complementary half-sums H(2s−2) and H̄(2s−2), and H(2s−1) and H̄(2s−1) signals. The logical circuit 186 of FIG. 6b implements the two-bit carry Generate G(2s−1,2s−2)≡G(2s−1,2) [the symbol (≡) indicates that the term on the right side is a short version of the term on left side] and the modified two-bit carry Integrate (Propagate) I(2s−1,2) terms according to the following signal expressions of Equation Group No. 1. The symbol (±) represent complementary output gates;

Eq. Group No. 1:

$$\bar{X}(2s-2) + \bar{Y}(2s-2) = \pm \bar{G}(2s-2)$$

$$X(2s-2) + Y(2s-2) = \pm P(2s-2)$$

$$G(2s-2) + \bar{P}(2s-2) = \pm \bar{H}(2s-2)$$

$$\bar{X}(2s-1) + \bar{Y}(2s-1) = \pm \bar{G}(2s-1)$$

$$X(2s-1) + Y(2s-1) = \pm P(2s-1)$$

$$G(2s-1) + \bar{P}(2s-1) = \pm \bar{H}(2s-1)$$

$$\bar{X}(2s-1) + \bar{X}(2s-2) + \bar{Y}(2s-2) = \pm [\bar{X}(2s-1) + \bar{G}(2s-2)]$$

$$\bar{Y}(2s-1) + \bar{X}(2s-2) + \bar{Y}(2s-2) = \pm [\bar{Y}(2s-1) + \bar{G}(2s-2)]$$

$$¥\ ED = \quad G(2s-1) + [X(2s-1) + Y(2s-1)] \cdot G(2s-2) =$$

$$= G(2s-1) + P(2s-1) \cdot G(2s-2) = G(2s-1, 2s-2) \equiv G(2s-1, 2)$$

$$= CD = \quad \bar{G}(2s-1) \cdot \{[\bar{X}(2s-1) \cdot \bar{Y}(2s-1)] + \bar{G}(2s-2)\} =$$

$$= \bar{G}(2s-1) \cdot [\bar{P}(2s-1) + \bar{G}(2s-2)] = \bar{G}(2s-1, 2s-2) \equiv \bar{G}(2s-1, 2)$$

$$\underline{X(2s-1)} + X(2s-2) + Y(2s-2) = \pm [X(2s-1) + P(2s-2)]$$

$$\underline{Y(2s-1)} + X(2s-2) + Y(2s-2) = \pm [Y(2s-1) + P(2s-2)]$$

$$¥\ ED = \quad \bar{P}(2s-1) + [\bar{X}(2s-1) + \bar{Y}(2s-1)] \cdot \bar{P}(2s-2) =$$

$$= \bar{P}(2s-1) + \bar{G}(2s-1) \cdot \bar{P}(2s-2) = \bar{I}(2s-1, 2s-2) \equiv \bar{I}(2s-1, 2)$$

$$= CD = \quad P(2s-1) \cdot \{[X(2s-1) \cdot Y(2s-1)] + P(2s-2)\} =$$

$$= P(2s-1) \cdot [G(2s-1) + P(2s-2)] = I(2s-1, 2s-2) \equiv I(2s-1, 2)$$

The underlined input terms X/Y(2s–1) are the modifying term for I(2s–1,2) and Ī(2s–1,2) of the twin complementary output signals with respect to the prior art. The output signals G(2s–1,2) and Ī(2s–1,2) are highly loaded (12 loads), therefore, the ED gates 188 produce the following logical-sum (E) signals, for driving four fanouts at the appropriate location (slice);

$$G(2s-2)+G(2s-1)=\Sigma G(2s-1,2) \quad \text{(Eq. 7a)}$$

$$\bar{P}(2s-2)+\bar{P}(2s-1)=\Sigma\bar{P}(2s-1,2) \quad \text{(Eq. 7b)}$$

The other 8 loads are driven with a TWIN-OUTPUT signal (reference to *MCA3 ETL Series Design*, Par. 4.2.7, published by Motorola 1991). FIG. 7a shows the basic QCC-cell 34 which readily provides four output signals having the complementary output signals Gτ, Ḡτ, Īτ and Iτ. FIG. 7b shows a QCC-cell 36 which is a minimized cell of FIG. 7a and FIG. 7c shows a QCC-cell 38 which is a further minimization of FIG. 7b providing the signals:

$$\bar{\Sigma}_{\tau=..}\ G\tau \text{ and } \bar{\Sigma}_{\tau=..}\ \bar{I}\tau$$

which are a substitute for the Gτ and Īτ signals. These substitute signals (marked with ¯) are referred to herein as Quasi-Sum signals which are no longer the complementary signals of the ED outputs and no longer contain the information that maintains the IMPLY relation. Yet, in order to reduce fanout, the Quasi-Sum signals are used at appropriate locations replacing logical-sum signals, e.g. at the sum-level. The ED output signals still contain the information that maintains the IMPLY relation $\bar{G}\beta+I\beta=1$ (ED is an Emitter Dot NOR/WIRED-OR gate and CD is a Collector Dot OR/WIRED-AND gate). Each cell of FIGS. 7a–7c may be used in a Quaternary EIC-system.

The Quasi-Sum signals $^{-}\Sigma G\beta$ and $^{-}\Sigma\bar{I}\beta$ may replace, where possible, the original signals Gβ and Īβ at locations ΣGβ and ΣĪβ inputs in FIGS. 7a–7c. The minimized terms are used, shown as an example, in the following twin binary signal functions:

$$G\tau ¥ \bar{I}\beta\cdot(G\beta+G\alpha)=(Z1) \text{ and } I\tau ¥ \bar{G}\beta\cdot(I\beta+\bar{I}\alpha)=(\bar{Z}2);$$

$$\bar{G}\tau ¥ \underline{I\beta}\cdot(^{-}\Sigma G\beta+G\alpha) \text{ and } \underline{I\tau} ¥ \underline{\bar{G}\beta}\cdot(^{-}\Sigma\bar{I}\beta+\bar{I}\alpha).$$

The IMPLY relationship is still maintained between the marked twin signal function $\underline{\bar{G}B}+\underline{\bar{I}B}=1$ and $\underline{\bar{G}\tau}+\underline{I\tau}=1$.

Only one QC-cell 38 level is required to implement the carry system for the 16-bits adder. The Quaternary Generate and Integrate carry signals are as given in the Equation Group No. 2;

Eq. Group No. 2:

$$G(2s-7,8) + G(2s-5,6) + \Sigma G(2s-3,4) + G(2s-2) \begin{array}{l} = {}^{-}\Sigma \quad G(2s-2,8) \\ ¥\ \} \\ \} \end{array}$$

$$I(2s-5,6) + \Sigma G(2s-3,4) + G(2s-2)\ ¥\ \}$$

Eq. Group No. 2:
-continued $$
\begin{aligned}
&I(2s-3,4) + \Sigma G(2s-2) ¥ \left.\begin{array}{r}\}\\ \}\end{array}\right\} ED\ \bar{G}(2s-2,8)\\
&\bar{P}(2s-2) = \}\\
&\quad = \ ^-\Sigma\quad \bar{I}(2s-2,8)\\
&\bar{I}(2s-7,8) + \bar{I}(2s-5,6) + \Sigma\bar{I}(2s-3,4) + \bar{I}(2s-2)\\
&\qquad\qquad ¥\ \}\\
&\bar{G}(2s-5,6) + \Sigma\bar{I}(2s-3,4) + \bar{I}(2s-2) ¥\ \}\\
&\qquad\qquad\qquad\qquad\qquad\qquad\qquad \}\ ED\ I(2s-2,8)\\
&\bar{G}(2s-3,4) + \Sigma\bar{I}(2s-2) ¥\ \}\\
&G(2s-2) = \}\\
&\quad = \ ^-\Sigma\quad G(2s-1,8)\\
&G(2s-7,8) + G(2s-5,6) + \Sigma G(2s-3,4) + G(2s-2)\\
&\qquad\qquad ¥\ \}\\
&I(2s-5,6) + \Sigma G(2s-3,4) + G(2s-1,2) ¥\ \}\\
&\qquad\qquad\qquad\qquad\qquad\qquad\qquad \}\ ED\ \bar{G}(2s-1,8)\\
&I(2s-3,4) + G(2s-1,2) ¥\ \}\\
&\bar{I}(2s-1,2) = \}\\
&\quad = \ ^-\Sigma\quad \bar{I}(2s-1,8)\\
&\bar{I}(2s-7,8) + \bar{I}(2s-5,6) + \Sigma\bar{I}(2s-3,4) + I(2s-1,2)\\
&\qquad\qquad ¥\ \}\\
&\bar{G}(2s-5,6) + \Sigma\bar{I}(2s-3,4) + \bar{I}(2s-1,2) ¥\ \}\\
&\qquad\qquad\qquad\qquad\qquad\qquad\qquad \}\ ED\ I(2s-1,8)\\
&\bar{G}(2s-3,4) + \bar{I}(2s-1,2) ¥\ \}\\
&G(2s-1,2) = \}
\end{aligned}
$$

The sum-level comprises the extended bit-sums 190 of FIG. 6d, which is a modification of the prior art extended bit-sum gate that implements the following signal expression;

$$Fj¥\bar{H}j+[G(j-1,i)+I(j-1,i)\cdot Ci],\ \text{where}\ \bar{H}j¥\bar{G}j\cdot \bar{I}j$$

Four NOR/OR gates are Wired-OR and/or Wired-AND as given in the following Equation Group No. 3;

Eq. Group No. 3:

$$
\begin{aligned}
&C(2s-8) + {}^-\Sigma G(2s-2,8) + \bar{H}(2s-1) = \pm\ \}\ ED\ F(2s-1)\\
&\bar{G}(2s-2,8) + H(2s-1) = \pm\ \}\\
&\bar{C}(2s-8) + {}^-\Sigma\bar{I}(2s-2,8) + H(2s-1) = \pm\ \}\\
&I(2s-2,8) + \bar{H}(2s-1) = \pm\ \}\ CD\ \bar{F}(2s-1)\\
&C(2s-8) + {}^-\Sigma G(2s-1,8) + \bar{H}(2s) = \pm\ \}\ ED\ F(2s)\\
&\bar{G}(2s-1,8) + H(2s) = \pm\ \}\\
&\bar{C}(2s-8) + {}^-\Sigma\bar{I}(2s-1,8) + H(2s) = \pm\ \}\\
&I(2s-1,8) + \bar{H}(2s) = \pm\ \}\ CD\ \bar{F}(2s)
\end{aligned}
$$

The input terminals having subscript 0 (s=1) are connected as follows: $\bar{X}0=\bar{C}in=\bar{C}1$, $X0=Cin=C1$, $\bar{Y}0$ and $Y0$ are connected to 0 or optionally to a DIsable/Enable signal (DI/$\overline{EN}$) which provides a programmable controllable Carry-input whether to function with or without a Cin signal. Therefore:

$$\bar{G}0=\bar{C}in+DI=\bar{C}*1=(\bar{C}1),\ G0=Cin\cdot\overline{DI}=C*1=(C1)$$

$$I0=Cin+DI=C1=(C1),\ \bar{I}0=\bar{C}in\cdot\overline{DI}=\bar{C}1=(\bar{C}1)$$

The asterisks (*) and (**) are attached to C1 to distinguish between the sources of C1.

The unwired inputs should be connected to LOGIC LOW "0".

For s=8 the input terminals $\bar{H}(2g)$ and $H(2g)$ should respectively accept the $\bar{H}16$ and $H16$ signals Eqs. 8 which are produced by an additional circuit 182, $$
\begin{aligned}
\bar{X}16 + \bar{Y}16 &= \pm\ \bar{G}16\quad \}\ ED\ \bar{H}16 &\text{(Eq. 8a)}\\
&\qquad\qquad\qquad \}\\
X16 + Y16 &= \pm\ P16\quad \}\ CD\ H16 &\text{(Eq. 8b)}
\end{aligned}
$$

For s=1, the output signals $\bar{G}(2s-1,2)$, $I(2s-1,2)$, $\bar{I}(2s-1, 2)$ and $G(2s-1, 2)$ are respectively $\bar{C}*2$, $C2$, $\bar{C}2$ and $C*2$.

For $4 \geq s \geq 1$, the $I(2s-1, 8)$ signals becomes the $C(2s)$ signals and the $\bar{G}(2s-1, 8)$ signals becomes the $\bar{C}(2s)$ signals. Thus, $C**2$, $C*2$, $C**4$, $C*4$, $C**6$, $\bar{C}*6$, $C**8$ and $C*8$ are available and used at the next logical level (the sum-level).

The Overflow signal expression (OV16), not shown in the drawings can be implemented by utilizing Eq. 9;

$$
\begin{aligned}
\text{Over-Flow gate,}\ [P16 + \bar{G}(15,8)] &= \pm\ \}\ ED + OV16 &\text{(Eq. 9)}\\
&\qquad\qquad \}\\
[P16 + \bar{I}(15,8) + \bar{C}8] &= \pm\ \}\\
&\qquad\qquad \}\\
[\bar{G}16 + I(15,8)] &= \pm\ \}\\
&\qquad\qquad \}\\
[\bar{G}16 + G(15,8) + C8] &= \pm\ \}\ CD = \overline{OV}16
\end{aligned}
$$

Notice that for $4 \geq s \geq 1$, the extended bit-sum cells 190 of FIG. 6d, which are connected to the peripheral input terminals having subscript [<0] can respectively be replaced by the prior art logical circuit 192 as in FIG. 6c. This design sacrifices the unique and regular slice constructions. Also, the QC-cell 38 having input signals with subscript [0] can be eliminated or minimized, at s=3 minimized to Ternary Complementary Carry cells (TC-cell), at s=2 minimized to Binary Complementary Carry cells (BC-cell) and at s=1 eliminated and the signals G(2s–2) and P(2s–2) have 6 fanout loads.

IMPLEMENTATION WITH A COMPLEMENTARY (C-MOS) TECHNOLOGY

Reference is made to FIGS. 3a–3i. As already shown, the implementation by the two different binary inverting gates represented by FIGS. 1c and 1e achieve the same logical results if the input signal pair Su and Sv (which is respectively connected to the U and V inputs of the gates) has between the input signals the preexisting relationship Su+Sv=1.

This feature leads to a new family of gate construction with a C-MOS technology, herein defined as Symmetrical/Anti-Symmetrical (SAS) C-MOS gates structures, having associatively symmetrical wiring of the (transistor) switching part (drain and source) and crosswise Anti-Symmetrical wiring of the (transistor) actuating part (the gate).

Figure 3A:
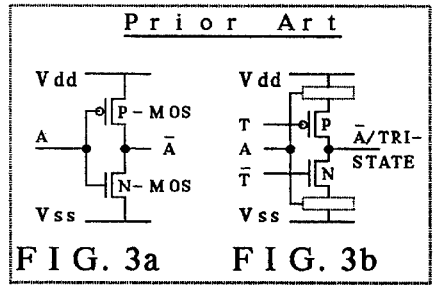
FIGS. 3a and 3b illustrate, for reference only, prior art implementations with Complementary (MOS) technology of an inverter and of a gate operating in a Tri-State mode.
Figure 3B:
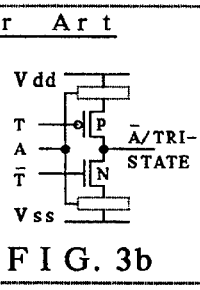

FIG. 3a shows a prior art implementation with a common input terminal connected to the complementary transistor gate pair forming an inverter, meaning that the same signal and polarity is fed as input to the circuit. FIG. 3b shows a prior art implementation with separate input terminals connected to the complementary switching gates of the Tri-State circuit. This circuit is actuated by complementary T and $\bar{T}$ signal pair, obviously, with the two different inputs, and this inverted signal pair is actually the common part (B=A) of the IMPLY relationship B≥A, A+B=1.

Figure 3C:
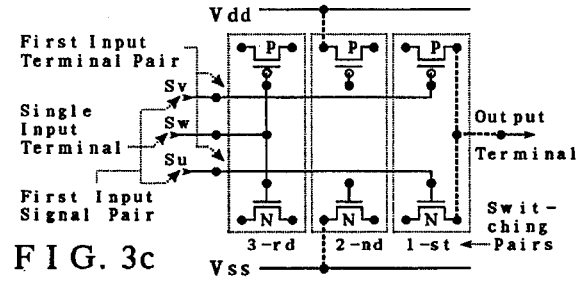
FIG. 3c illustrates, in accordance with the present invention, a schematic of basic logic components for circuit implementation with CMOS technology of a gate being inputted with a twin input signal pair having between them, a predetermined logic relationship.

In FIG. 3c a separate input terminal pair is shown connected to the gates of the first transistor pair being fed by a pair of signals, Su and Sv, which are not complementary (but Sv includes Su). This pair of signals Su and Sv corresponds to B includes A (B>A), and this feature is accomplished by additional circuitry as given by FIGS. 3d, 3e, 3f, 3g and others.

Figure 3D:
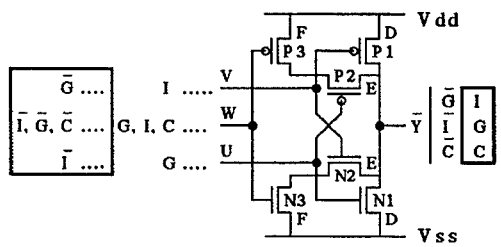
FIG. 3d illustrates, in accordance with the present invention, a C-MOS technology circuit implementation of an AND-NOR gate, given in FIG. 1c and utilizing the schematic of the basic logic components given in FIG. 3c, featuring a nonconventional gate combination having a Symmetrical switching components wiring layout and a crosswise (Anti-Symmetrical) actuation wiring layout, referred to herein as a Binary SAS Inverting Gate (SAS gate), having further in accordance with the present invention, an input signal pair with a preexisting logic relationship of predetermined signal expressions.
Figure 3E:
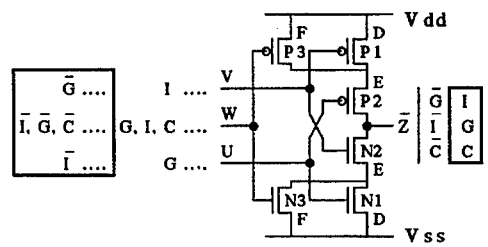
FIG. 3e. illustrates, in accordance with the present invention, a C-MOS technology circuit implementation, similar to that of FIG. 3d, featuring the use of a non-conventional gate combination of an OR-NAND gate, given in FIG. 1e.

The implementation of the SAS C-MOS binary gates are given in FIGS. 3d and 3e [Y=U+V·W (=) V·(U+W)=Z] [the symbol (=) indicates equality due to the IMPLY relation], which shows the novel embodiment of the expression $\bar{Y}$¥U+V·W [or the novel embodiment of the expression $\bar{Z}$¥V·(U+W)].

At the n-MOS zone there are D, E and F n-MOS transistors. The drains of transistors D and E are connected to the Y output and the source of transistor D is connected to the Vss. The source of transistor E is connected to the drain of transistor F and the source of transistor F is connected to the Vss.

At the p-MOS zone there are D, E and F p-MOS transistors. The drains of transistors D and E are connected to the Y [or Z] output and the source of transistor D is connected to the Vdd. The source of transistor E is connected to the drain of transistor F, and the source of transistor F is connected to the Vdd.

The U input end is connected to gates of the D n-MOS and E p-MOS transistors, the V input end is connected to the gates of the E n-MOS and D p-MOS transistors and the W input end is connected to the gates of both F transistors.

The use of the gate of FIG. 3d, is limited and requires that the condition U·$\bar{V}$=0 always occurs (IMPLY condition), and this is exactly the case of Gα·Iα which never occurs with the novel matched twin G and I signal pairs. If such a condition occurs then a short-circuit path, Vdd to Vss, is caused through the respective G n-MOS and I p-MOS transistors.

The use of the gate of FIG. 3e has the advantage that if the case U·V=1 occurs the gate is in a high impedance state (a Tri-State gate) condition. This feature can be combined into bit-sum cells and can be used to drive a bus having parallel inputs.

Figure 3F:
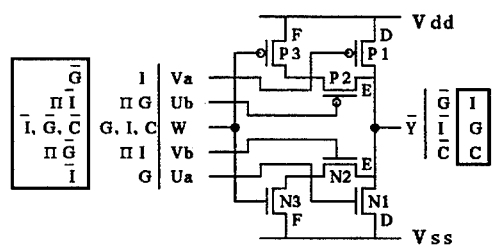
FIG. 3f illustrates a unique version of FIG. 3d.
Figure 3G:
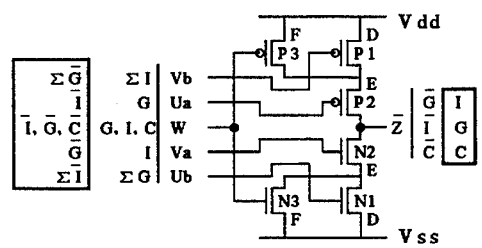
FIG. 3g illustrates a unique version of FIG.

Further gate structures are given in FIGS. 3f and 3g, where logic functions of carry signals are implemented in a specific way, by using different associative G and I signal expressions for the n-type and p-type transistors having the following signal expressions:

| for the n-type; $Cout = G\beta + \pi I\beta \cdot Cin$ and | (Eq. 10a) |
| for the p-type; $Cout = I\beta + \pi G\beta \cdot Cin$, or | (Eq. 10b) |
| for the n-type; $Cout = I\beta \cdot (\Sigma G\beta + Cin)$ and | (Eq. 10c) |
| for the p-type: $Cout = G\beta \cdot (\Sigma I\beta + Cin)$ | (Eq. 10d) | which requires additional input signals and input terminals, however, except for the input signal at the W input terminal the input signals have only one transistor (capacitance) load.

In FIGS. 3d, 3e, 3f and 3g there are respectively given the signals G[ ... ], $\bar{G}$[ ... ], I[ ... ], $\bar{I}$[ ... ], C[ ... ] and $\bar{C}$[ ... ], for each corresponding input U, V and W of the gates, which are used for producing a carry system. The subscripts were already discussed.

A pair of Binary SAS C-MOS gates comprises a BIC-cell 20 which performs the same functions as FIG. 1d (or as FIG. 1f).

Figure 3H:
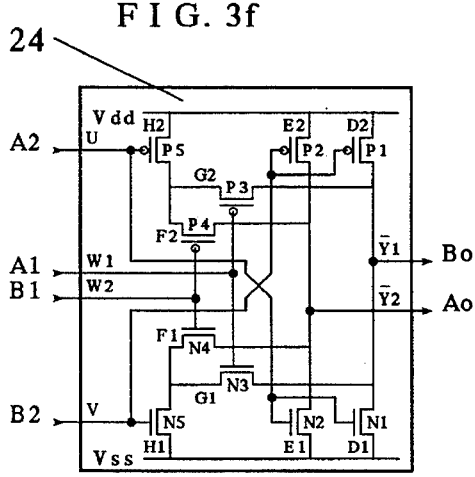
FIG. 3h illustrates a C-MOS technology circuit implementation of a BIC-cell as described in FIG. 1d, comprising two modified binary SAS gates related to FIG. 3d, implementing a novel binary twin Generate and Integrate output signal pair, with the twin output signal pair having a predetermined logic relationship.
Figure 3I:
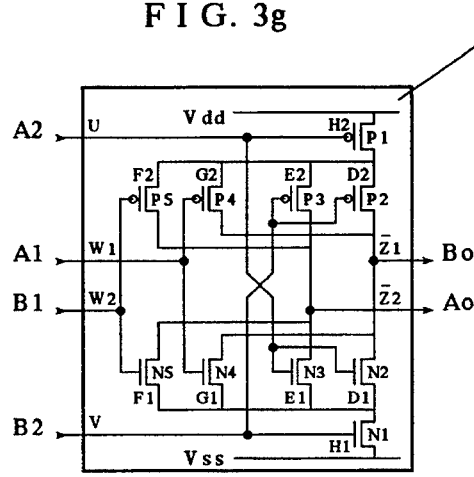
FIG. 3*i* illustrates a C-MOS technology circuit implementation of a BIC-cell as described in FIG. 1*f*, comprising two modified binary SAS gates related to FIG. 3*e*, implementing a novel binary twin Generate and Integrate output signal pair, with the twin output signal pair having a predetermined logic relationship.

FIG. 3h (or FIG. 3i) provides a further modification of the BIC-cell 20 which comprises ten transistors rather than twelve. The BIC-cell 24 comprises five N-type MOS transistor D1, E1, F1, G1 and H1 and five P-type MOS transistor D2, E2, F2, G2 and H2 having the circuit embodiment as follows.

The input end A2 is connected to the gates of H2, E1 and D1.

The input end B2 is connected to the gates of H1, E2 and D2.

The input end A1 is connected to the gates of G1 and G2.

The input end B1 is connected to the gates of F1 and F2.

The sources of H2, E2 and D2 are connected to Vdd.

The sources of H1, E1 and D1 are connected to ground.

The drain of H2 is connected to the sources of G2 and F2.

The drain of H1 is connected to the sources of G1 and F1.

The drains of G1, G2, D1 and D2 are connected to the output B0.

The drains of F1, F2, E1 and E2 are connected to the output A0.

Combining two SAS CMOS gates into one BIC-cell 24 saves two transistors, therefore, for two inputs A2 and B2 the capacity load is reduced by one, the inputs A2 and B2 are not loaded by pairs.

The gate represented by the following logic expression:

$$Y = U + V \cdot W \; (=) \; V \cdot (U+W) = Z \qquad (Eq. 8)$$

corresponds as an example, to the following representative signal expressions: Cout=Gβ+Iβ·Cin (=) Iβ·(Gβ+Cin)=Cout.

The logic circuitry of gate, the n-MOS transistors and the p-MOS transistors, are the same AND-OR combination with respect to the output Y for U+V·W or the same OR-AND combination with respect to the output Z for V·(U+W).

The G signal will be connected to the U input of the n-MOS transistor and to the V input of the p-MOS transistor.

The I signal will be connected to the V input of the n-MOS transistor and to the U input of the p-MOS transistor.

The C or $\bar{C}$ signals will commonly be connected to the W inputs of the n-MOS and the p.-MOS transistors.

The W input may respectively accept G or I signals of the same polarity as the signals to U and V inputs.

Reference is made to FIGS. 4a–4d showing ternary inverting gates which are based on R=3. FIGS. 4a–4b are respectively implementing the four different gate structures for the four different logic expressions giving the same logical results. The four logic expressions having the same logic sense are:

$U3+V3\cdot(U2+V2\cdot W)=U3+V3\cdot V2\cdot(U2\cdot W)=V3\cdot(U3+U2+V2\cdot W)=V3\cdot[U3+V2\cdot(U2+W)]$ The circuit implementation for the four different ternary SAS-MOS gates are given in:

FIG. 4a. $\overline{YY}$¥$U3+V3\cdot(U2+V2\cdot W)$

FIG. 4b. $\overline{YZ}$¥$U3+V3\cdot V2\cdot(U2+W)$

FIG. 4c. $\overline{ZY}$¥$V3\cdot(U3+U2+V2\cdot W)$

FIG. 4d. $\overline{ZZ}$¥$V3\cdot[U3+V2\cdot(U2+W)]$

U3 and V3 are the input end pair wherein the pair of signals Su3 and Sv3 maintain the relation $\bar{S}u3+Sv3=1$. U2 and V2 are the input end pair wherein the pair of signals Su2 and Sv2 maintain the relation $\bar{S}u2+Sv2=1$.

Signal expressions that yields FYY=FYZ=FZY=FZZ are referred to herein as Ternary signal functions.

A pair of either one or two of the four different Ternary SAS C-MOS gates of FIGS. 4a–4d comprise a logical TIC-cell 32, as shown in FIG. 4e. The TIC-cell 32 has one output end pair (Ao, Bo) and three input end pairs (A3, B3), (A2, B2) and (A1, B1).

Input end U3 of both gates are wired to A3 and input end V3 of both gates ape wired to B3, Input end U2 of both gates are wired to A2 and input end V2 of both gates are wired to B2. Input end W=W1 of one gate is wired to B1 which defines the output YY1 and input end W=W2 of the other gate is wired to A1 which defines the output YY2.

Inputs W1 and W2 contain the pair of input ends having the pair of signals Sw1 and Sw2 which maintain the relation $\bar{S}w1+Sw2=1$.

Figure 5A:
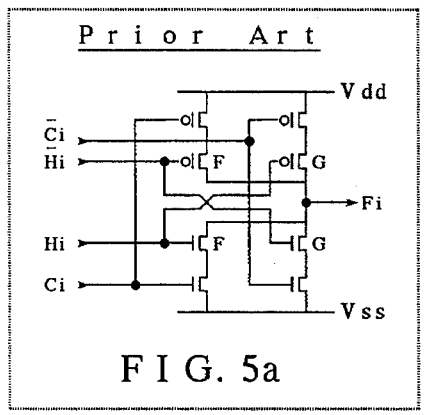
FIG. 5*a* illustrates, with a C-MOS technology, a prior art circuit implementation of a typical bit-sum cell.
Figure 5B:
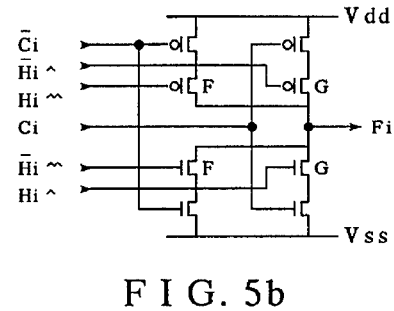
FIG. 5*b* illustrates, with a C-MOS technology, a circuit implementation of a bit-sum cell, given in FIG. 5*a*, which incorporates the Tri-State connection through the half-sum H signals.
Figure 5C:
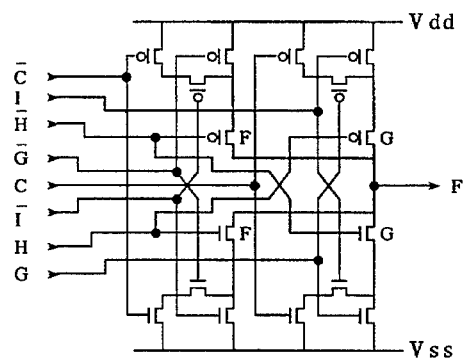
FIG. 5*c* illustrates, with a C-MOS technology, in accordance with the present invention, a modified circuit implementation of an extended bit-sum cell.

Reference is made to FIGS. 5a and 5c. FIG. 5a represents an ordinary bit-sum gate which can be used with the BGB-system of FIG. 10. FIG. 5c is a modified extended bit-sum gate which can be used with the TGT-system of FIG. 11.

THE TRI-STATE EMBODIMENT OF AN ADDER

Figure 5D:
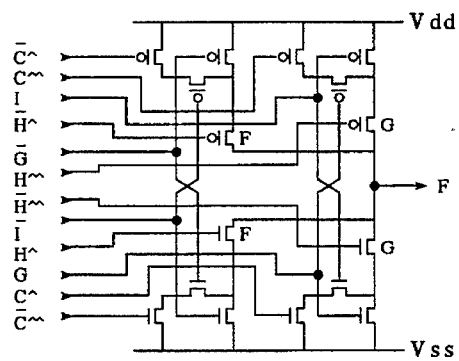
FIG. 5*d* illustrates a circuit implementation of a bit-sum cell, given in FIG. 5*c* which incorporates the Tri-State connection as described in FIG. 5*b* and incorporates a connection whether to ENable or DIsable a carry input signal into the sum level.
Figure 5E:
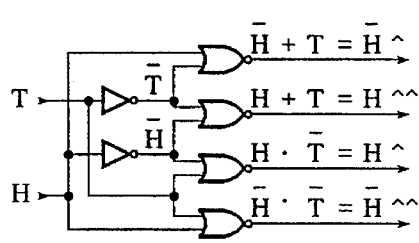
FIG. 5*e* illustrates a logic schematic that produces the four combined Tri-State signal functions which are used with FIGS. 5*b* and 5*d*.
Figure 5J:
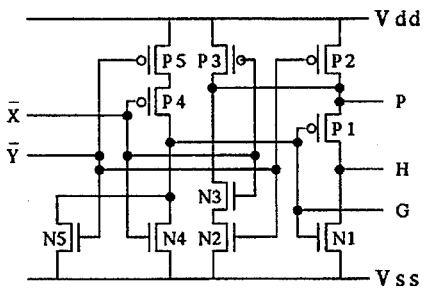
FIG. 5*j* illustrates a novel minimized implementation of the H function as a function of G and P.

Reference is made to FIGS. 5b, 5c, 5d and 5e. In order to connect in parallel several input sources, e.g. bi-directional gates with bit-sum outputs of an adder to a bus, a Tri-State signal T is combined as shown in FIG. 5e with the half-sum Hi and $\bar{H}$i signals producing four signals H^i, $\bar{H}$^i, H^^i and $\bar{H}$^^i. These signals are respectively connected to the appropriate inputs of FIG. 5b replacing FIG. 5a, or to the appropriate inputs of FIG. 5d replacing FIG. 5c.

Including the Tri-State function with the bit-sums logic circuitry does not adversely affect the worst case signal path, rather, these bit-sum gates feature a reduction of the propagation delay through the critical carry signal path with respect to the prior art.

In FIG. 5b the H^i signal is connected to the G gate at the N-zone, the $\bar{H}$^^i signal is connected to the F gate at the N-zone, the $\bar{H}$^i signal is connected to the G gate at the P-zone and the H^^i signal is connected to the F gate at the P-zone. A similar construction is shown in FIG. 5d.

As a result, further examples of N-bit adders, similar to the descriptions of FIGS. 9, 10 and 11 are designed with the CMOS technology implementing the Tri-State option.

USING A CONTROLLABLE PROGRAMMABLE CARRY-IN INPUT

Reference is made to FIGS. 5d and 5e. Adders may function with or without a Cin carry input, having different features. In my previous patent U.S. Pat. No. 4,584,661 such an implementation (splitting a multi-bit adder) is described.

Implementing this option (with or without Cin) with the CMOS technology, requires the implementation of a bit-sum cell as shown in FIG. 5d where the input signals Cin and $\bar{C}$in are separated into two signals respectively, C^in and C^^in and to $\bar{C}$^in and $\bar{C}$^^in signals. This implementation uses the logic schematic as shown in FIG. 5e where H and $\bar{H}$ are respectively replaced by Cin and $\bar{C}$in and T is replaced by $\overline{EN}$ signal giving the required signal expressions.

As a result, further examples of grouped (g groups of N-bits) adders similar to the description of FIG. 11, featuring adder partitioning can be implemented, while designing with the SAS CMOS technology gates and the optional carry-in input.

A SPECIAL GATE FOR SKIP CARRY TECHNIQUE

Figure 4F:
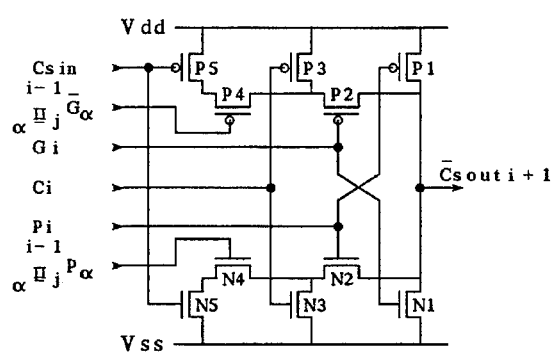
FIG. 4*f* illustrates in accordance with the present invention, a C-MOS technology circuit implementation of logic circuitries, for implementing a novel gate for a skip carry system.

FIG. 4f represents one example of a special gate which is useful in a skip carry technique. This gate combines the skip carry (Cs) signal over a Variable Group (g) of propagate signals in parallel with the ripple carry (Cr) signal. Two different (inhibited) signals $\pi$P and $\pi$G are used for the skip gate, each loaded by only one transistor according to the following signal expressions of the carry skip gate;

$$\text{at the } n\text{-MOS zone } Gj + Pj \cdot [Crj + \{\pi Pg\} \cdot Cs(i+1)] \genfrac{}{}{0pt}{}{j-1}{g=i}$$

$$\text{at the } p\text{-MOS zone } Pj + Gj \cdot [Crj + \{\pi Gg\} \cdot Cs(i+1)] \genfrac{}{}{0pt}{}{j-1}{g=i} = Cs\,out(j+1)$$

IMPLEMENTING AN ARITHMETIC ZERO AS A THIRD STATE OUTPUT

Figure 5G:
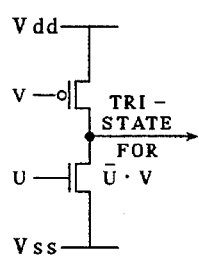
FIG. 5*g* illustrates an elementary complementary conduction/inverting N-mos and non-conduction/inverting P-mos transistor pair combination having in accordance with the present invention, an input signal pair with a preexisting logic relationship of- predetermined signal expressions providing meaningful Tri-State output states.
Figure 5H:
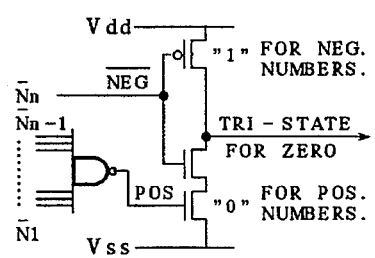
FIG. 5*h* illustrates a useful implementation of FIG.
Figure 5I:
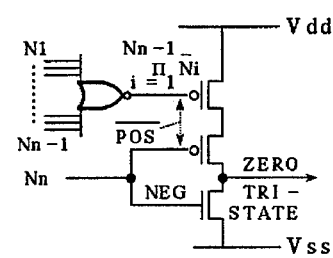
FIG. 5*i* illustrates an alternative version of FIG. 5*h*.

Reference is made to FIGS. 5g, 5h and 5i. FIG. 5h is an example, showing a logic circuit where an arithmetic zero is represented as the third state output. "LOW" ("0") representing negative numbers and "HIGH" ("1") representing positive numbers.

An N-bit operand is represented by Bn bits, where $1 \leq n \leq N$, the N-th Bit is the sign bit, negative numbers (NEG) are represented by BN, zero (ZERO) is represented by $$\pi_{n=1}^{N} \bar{B}n$$

and positive numbers (POS) are represented by $$\bar{B}n \cdot \sum_{n=1}^{N-1} Bn.$$

POS and NEG are INHIBITed or POS IMPLIES $\overline{NEG}$, which also means that NEG IMPLIES $\overline{POS}$, $\overline{POS}$ overlaps $\overline{NEG}$ at ZERO ($\overline{POS} \cdot \overline{NEG}$). The condition (POS·NEG)

never occurs. The Tri-State output state for zero, provides the introduction of an alternative input signal to the output node.

Having described the invention with regard to certain specific embodiments thereof, it is to be understood that the description is not meant as a limitation since further modifications may now become apparent to those skilled in the art, and it is intended to cover such modifications as fall within the scope of the appended claims.

I claim:

1. An inverting-type logic element defined as a Binary Inverting Cell (BI-Cell) comprising:

a pair of first and second output terminations Ao and Bo;

at least first and second input termination pairs (Ai-Bi), each pair having first (Ai) and second (Bi) input terminations, and a first and second non-inverting type logic gate and a first and second inverting-type logic gate, said first non-inverting type logic gate providing its output to an input of said first inverting-type logic gate, said first non-inverting type logic gate and said first inverting-type logic gate defined as a first combined gate and having its output (Z1) being connected to said Bo output termination, said second non-inverting type logic gate providing its output to an input of said second inverting-type logic gate, said second non-inverting type logic gate and said second inverting-type logic gate defined as a second combined gate and having its output (Z2) being connected to said Ao output termination, each of said first and second combined gates having inputs U1, V1 and W, said first input termination (A1) of said first input termination pair being connected to said input (W) at said non-inverting type gate of said first combined gate, defined as W1, said second input termination (B1) of said first input termination pair being connected to said (W) at said non-inverting type gate of said second combined gate, defined as W2, said first input termination (A2) of said second input termination pair being connected in common to said inputs (U1) of said inverting-type logic gates of said first and second combined gates, said second input termination (B2) of said second input termination pair being connected in common to said inputs (V1) of said non-inverting type logic gates of said first and second combined gates, wherein said input termination pairs (Ai,Bi) are respectively provided with input signal pairs (Sai, Sbi), said input signal pairs having the IMPY relationship:

$\overline{Sai} + Sbi = 1$ where $Sbi \supset Sai$;

and wherein said first and second output terminations Ao and Bo provide, respectively, a binary output signal pair Sao and Sbo, and wherein said inverting-type logic element is characterized in that said first and second binary output signals Sao and Sbo are related by the logical IMPLY relation:

$\overline{Sao} + Sbo = 1$, where $Sbo \supset Sao$.

2. The logic element of claim 1 wherein each of said non-inverting type logic gates are AND gates, and each of said inverting-type logic gates are NOR gates, said BI-cell being operable such that $Z1 = \overline{U1 + V1 \cdot W1}$, and $Z2 = \overline{U1 + V1 \cdot W2}$.

3. The logic element of claim 2, defined as a ternary inverting cell (TI-cell) further comprising:

a third input termination pair (A3-B3) having an input signal pair (Sa3-Sb3) respectively represented as (U2, V2), each of said first and second combined gates further comprising an additional non-inverting type AND Gate, said first combined gate having said additional non-inverting type AND gate providing its output to an input of said inverting-type NOR gate, said second combined gate having said additional non-inverting inverting type AND gate providinq its output to an input of said inverting type NOR gate, said second input termination (B2) of said second input termination pair being connected in common to an input of said additional non-inverting type AND gates, said first input termination (A3) of said third input termination pair being connected in common to an input of said additional non-inverting type AND gates, said second input termination (B3) of said third input termination pair being connected in common to an input of said non-inverting type AND gates, wherein said outputs Z1 and Z2 are provided in accordance with:

$Z1 = \overline{U1 + V1 \cdot (U2 + V2 \cdot W1)}$, and $Z2 = \overline{U1 + V1 \cdot (U2 + V2 \cdot W2)}$.

4. The logic element of claim 3, defined as a symmetrical ternary inverting cell (STI-Cell), each of said first and second combined gates comprising:

N-type switching means and P-type switching means, wherein said first combined gate output $Z1 = \overline{U1 + V1 \cdot (U2 + V2 \cdot W1)}$ is implemented, respectively, in said N-type switching means by the logical relation $Z1' = \overline{U1 + V1 \cdot (U2 + V2 \cdot W1)}$, and in said P-type switching means, by the logical relation $Z1'' = \overline{V1 + U1 \cdot (V2 + U2 \cdot W1)}$, said logical relations Z1' and Z1'' being commonly connected and represented by said output Z1, and wherein said second combined gate output $Z2 = \overline{U1 + V1 \cdot (U2 + V2)}$ is implemented, respectively, in said N-type switching means by the logical relation $Z2' = \overline{U1 V1 \cdot (U2 + V2 \cdot W2)}$, and in said P-type switching means, by the logical relation $Z2'' = \overline{V1 + U1 \cdot (V2 + U2 \cdot W2)}$, said logical relations Z2' and Z2" being commonly connected and represented by said output Z2.

5. A Tertiary Partitioned Expanding Interlaced Logic Array (TPEI-Array) using said TI-cells of claim 3 having Ain—i and Bin_i input pairs and Aout_i and Bout_i output pairs, where N≥i ≥1, R=3, and L≥e≥1, said L being a log function of N with respect to a partition base (R), according to L=log (R) N, comprising:

a plurality of said TI-cells, each located at position (e, i), where i≥R exp (e), wherein said input termination pairs A3–B3, A2–B2 and A1–B1 of each of said TI-cells at said positions (e, i) are respectively connected to said output termination pairs Ao-Bo of said TI-cells at stage (e31 1) and positions ((i−(r−1)*(R exp(e−1))) where R≥r≥1, wherein for stage e=1, said input termination pairs A3-B3, A2-B2 and A1-B1 of said TI-cells at position i, are respectively connected to said input pairs Ain_i and Bin__i such that, for TI-cells at positions (i+2), said A1-B1 being respectively connected to Ain_i and Bin—i, said A2-B2 being respectively connected to Ain—(i+1) and Bin—(i+1), and said A3-B3 being respectively connected to Ain—(i+2) and Bin—(i+2of, where input pairs Ain_1, Bin_1 and Ain_2, Bin_2 of said Ain—i, Bin—i input pairs are respectively connected to output pairs Aout—1, Bout—1 and Aout—2 of said Aout—i, Bout—i output pairs, and wherein output termination pairs Ao_Bo of said TI-cells at positions (e, i), within the boundaries (R exp(e+1))−1 ≥i≥R exp (e) are respectively and correspondingly connected to said output pairs Aout_i, Bout_i, such that at stage e=1 said i-th position boundaries are 8≥i≥3 and at stage e=2 for said L=2, said i-th positions boundaries are N≥i≥9, thus, Aout_9 and Bout_9 represent Aout_N and Bout_N, said TPEI-Array being characterized in that respective input signal pairs Sain_i and Sbin_i at said input pairs Ain_i and Bin_i maintain the IMPLY relationship Sain_i=1, where Sbin_i ⊃Sain_i and respective output pairs Saout_i and Sbout_i at said output pairs Aout_i and Bout_i maintain the IMPLY relationship Saout—i+Sbout—i=1, where Sbout—i⊃ Saout—i.

6. The logic element of claim 2, defined as a ternary inverting cell (TI-cell) further comprising:

a third input termination pair (A3-B-3) having an input signal pair (Sa3-Sb-3) respectively represented as (U2, V2), each of said first and second combined gates further comprising an additional non-inverting type AND gate.

said first combined gate having said additional non-inverting type AND gate providing its output to an input of said inverting-type NOR gate, said second combined gate having said additional non-inverting type AND gate providing its output to an input of said inverting-type NOR gate, said second input termination (B2) of said second input termination pair being connected in common to an input of said additional non-inverting type AND gates, said first input termination (A3) of said third input termination pair being connected in common to an input of said additional non-inverting type AND gates, said second input termination (B3) of said third input termination pair being connected in common to an input of said additional non-inverting type AND gates and to an input of said non-inverting type AND gates, wherein said outputs Z1 and Z2 are provided in accordance with:

$$Z1=\overline{U1+V1\cdot V2\cdot(U2+W1)}, and$$

$$Z2=\overline{U1+V1\cdot V2\cdot(U2+W2)}.$$

7. The logic element of claim 6, defined as a symmetrical ternary inverting cell (STI-Cell), each of said first and second combined gates comprising:

N-type switching means and P-type switching means, wherein said first combined gate output $$Z1= \overline{V1\cdot(U1+ V2\cdot(U2+W1))}$$

is implemented, respectively, in said N-type switching means by the logical relation $$Z1'=\overline{V1\cdot(U1+V2\cdot(U2+W1))},$$

and in said P-type switching means, by the logical relation $$Z1''=U1\cdot(V1+U2(V2+W1)),$$

said logical relations Z1' and Z1" being commonly connected and represented by said output Z1, and wherein said second combined gate output Z2=V1·(U1+ V2·(U2+W2)) is implemented, respectively, in said N-type switching means by the logical relation $$Z2'=\overline{V1\cdot(U1+V2+W1))},$$

and in said P-type switching means, by the logical relation $$Z2''= U1\cdot(V1+U2\cdot(V2+W2)),$$

said logical relations Z2' and Z2" being commonly connected and represented by said output Z2.

8. A multi-bit multi-stage logic array using said logic elements of claim 2, said multi-bit multi-stage logic array being defined as a Partitioned Expanding Interlaced (PEI) logic array, said PEI logic array having N bit-positions (i), where (N≥i≥1) and i=1 is the least significant bit-position, said PEI logic array having N input pairs (Ain—i, Bin_i), N output pairs (Aout_i, Bout_i), and having L stages (e), where (L≥e≥i), L being a log function of N with respect to a partition base (R), according to L= log (R) N for (R≥2), where, for R=2, a Binary Partitioned Expanding Interlaced logic array (BPEI-Array) is provided, for use as a carry system for an adder/subtractor/comparator to execute fast summation/subtraction operations and a fast COMPARE flag in-phase with said subtraction operations, said BPEI-Array having as inputs a first vector of bit signals within said N bit-positions and a second vector of bit signals within said N bit-positions, and a carry-in signal (C_1), wherein corresponding bits of said first and second bit-vector signals are fed as inputs to a plurality of NOR gate and NAND gate pairs at an input stage, an output of each of said NOR gates of said gate pairs being defined as a bit-generate signal which is provided to said Ain_i input of said input pairs, an output of each of said NAND gates of said gate pairs being defined as a bit-propagate signal which is provided to said Bin_i input of said input pairs, said bit-generate and bit-propagate signals forming a pair of signals at each bit-position (i), said BPEI array comprising:

a plurality of said logic elements in each stage (e) of said L stages, each of said logic elements having as inputs at each bit position (i), at its A1-B1 input termination pair, an n_bit-generate and an n_bit-integrate signal pair from a bit-position (i) of stage (e1) and having as inputs at its A2B2 input termination pair, an n_bit-generate and an n_bit-integrate signal pair from a more significant bit-position (i+2 exp(e-1) of said stage (e-1), wherein said n_bit generate and n_bit integrate signal pairs at stage (e-1=0) respectively correspond to said bit-generate and bit-propagate signal pairs of said input stage, each of said logic elements having as output signals, at its Ao-Bo output termination pair, an n_bit-generate and an n_bit-integrate signal pair, wherein n=2 exp(e), and wherein a portion of said Ao-Bo output termination pairs within the boundaries (R exp(e+1)−1)≧i≧ (R exp(e)) of bit position i at each stage being connected to said Aout_i and Bout_i output pairs, said Ain_1 and Bin_1 input pairs being connected to said Aout—1 and Bout—1 output pairs, each of said n_bit-generate and n_bit-integrate signal pairs being characterized in that they are related by the logical IMPLY relationship and they are usable for executing, simultaneously, both a COMPARE flag and a CARRYOUT signal within N-bits of said first and second bit-vector signals, wherein said COMPARE flag for n bits of distinct boundaries is defined as an output of a NOR gate, said NOR gate having as inputs said n_bit-generate signal and an inverted n_bit-integrate signal of said distinct boundaries, said COMPARE flag being provided upon execution of said subtraction operations, wherein each of said CARRYOUT (Cout_(i+1)) signals, over said n bits being obtained according to the logical function Cout_(i+1)=$n_{13}$ bit-generate +n_bit-integrate #Cin, wherein said Cin=Cout_$(i-n+}$1), and said n bit generate and n bit integrate signals are provided by said Aout_1 and Bout_i output pairs, and Cout_(i+1)=bit-generate+bit-propagate·C_1, wherein said bit-generate and bit propagate signals are provided by said Ain_1 and Bin_1 input pair, wherein said first and second input bit-vector signals are binary numbers.

9. A Binary-Grouped, Binary-Expanded array (BGBE-Array) using said logic arrays of claim 8, said BGBE-Array being utilized as a central portion of a carry system for multi-groups of bits, said BGBE-Array comprising:

at a first stage, a plurality (M) of said BPEI-arrays, each having e stages and having (J) input pairs (Ain_j, Bin_j) and (J) output pairs (Aout_j, Bout_j), where (J≧j≧1), and at a second stage, a BPEI-Array having e' stages and having (M) input pairs (Ain_-m and Bin_-m) and (M) output pairs (Aout_m and Bout_m), where (M≧m≧1), each BPEI-Array of said first stage being defined as an m'th BPEI-Array, corresponding to said m, wherein said output pair Aout_-J and Bout_-J of each of said m'th BPEI-Array being respectively connected to said input pairs Ain_-m and Bin_-m of said second stage BPEI-Array, and wherein said output pairs Aout_-m and Bout_-m of said second stage BPEI-Array provides said n_ bit-generate and n_ bit-integrate binary signals, each of said n_ bit-generate and n_ bit-integrate signal pairs being characterized in that they are related by the logical IMPLY relationship and they are usable for executing, simultaneously, both a COMPARE flag and a CARRYOUT signal in relation to a higher boundary i=J*m, where m is within said m boundaries, and lower boundary i=1+J*(m−1), where m is within the boundaries of (R exp(e')−1≧m≧(R exp(e'−1)), of said first and second input bit-vector signals.

10. The logic array of claim 8 said logic array being used to provide an in-phase signal pair (N−1) generate and (N−1) integrate for the less significant N−1bits of said first (X) and second (Y) N_ bit-vector signals each defining a binary number, where bit N represents a sign signal, said in-phase signal pair being utilized to define the mathematical inequalities (X>Y), (X≧Y), (X<Y) and (X≦Y) as logical conditions, said logic array further comprising:

a logic element according to claim 30 wherein said A2-B2 input termination pair thereof is respectively connected to said Aout_i and Bout_i output pairs at bit-position (2 exp (L)−1) and wherein said A1-B1 input termination pair thereof is respectively connected to said Aout_i and Bout_i output pairs at bit-position i= (2exp (L−1)), and wherein said Ao-Bo output termination pair thereof provide said N−1 generate (G(N−1, 1 ) ) and N−1 integrate (I(N−1, 1)) signals. and wherein said Ain_i and Bin_i input pair for i= N provides G(N) and P(N) signals, said G(N), P(N), G(N−1, 1) and I(N−1, 1) signals and their respective inverted signals being used for determining the presence of said logical conditions according to the following logical statements:

(1) (X> Y) IF G(N)+P(N)·fheight$\overline{G}$(N−1, 1) IS TRUE;

(2) (X> Y) IF G(N)+P(N)·fheight$\overline{I}$(N−1, 1) IS TRUE;

(3) (X< Y) IF fheight$\overline{P}$(N)+$\overline{G}$(N) ·I (N−1, 1) IS TRUE; and (4) (X≦ Y) IF fheight$\overline{P}$(N)+$\overline{G}$(N)·G(N−1, 1) IS TRUE.

11. The logic element of claim 2, defined as a symmetrical binary inverting cell (SBI-Cell), each of said first and second combined gates comprising:

N-type switching means and P-type switching means, wherein said first combined gate output Z1=U1+V1·W1 is implemented, respectively, in said n-type switching means by the logical relation $$Z1'=\overline{U1+V1\cdot W1},$$

and in said P-type switching means, by the logical relation $$Z1''=\overline{V1+U1\cdot W1},$$

said logical relations Z1' and Z1" being commonly connected and represented by said output Z1, and wherein said second combined gate output Z2=$\overline{U1+W2}$ is implemented, respectively, in said N-type switching means by the logical relation Z2"$\overline{U1=V1\cdot W2}$, and in said P-type switching means, by the logical relation Z2"=$\overline{V1+U1\cdot W2}$, said logical relations Z2'and Z2 " being commonly connected and represented by said output Z2.

12. The logic element of claim 1 wherein each of said non-inverting type logic gates are OR gates, and each of said inverting-type logic gates are NAND gates, said BI-cell being operable such that Z1=$\overline{V1\cdot(U1+W1)}$, and $Z2=\overline{V1+\overline{W2}}$ 13. The logic element of claim 12, defined as a ternary inverting cell (TI-cell) further comprising:
a third input termination pair (A3-B3) having an input signal pair (Sa3Sb3) repsectively represented as (U2, V2), each of said first and second combined gates further comprising an additional non-inverting type OR gate,
said first combined gate having said additional non-inverting type OR gate providing its output to an input of said inverting-type NAND gate,
said second combined gate having said additional non-inverting type OR gate providing its output to an input of said inverting-type NAND gate,
said first input termination (A2) of said second input termination pair being connected in common to an input of said additional non-inverting type OR gates,
said second input termination (B3) of said third input termination pair being connected in common to an input of said additional non-inverting type OR gates,
said first input termination (A3) of said third input termination pair being connectedin common to an input of said additional non-inverting type OR gates, and to an input of said non-inverting type OR gates,
wherein said outputs Z1 and Z2 are provided in accordance with:

$Z1=\overline{V1\cdot(U1+U2+V2\cdot W1)}$, and $Z2+\overline{V1\cdot(U1+U2+V2\cdot W2)}$.

14. The logic element of claim 13, defined as a symmetrical ternary inverting cell (STI-Cell), each of said first and second combined gates comprising:
N-type switching means and P-type switching means, wherein said first combined gate output $Z1=\overline{V1\cdot(U1+U2+V2\cdot W1)}$ is implemented, respectively, in said N-type switching means by the logical relation $Z1'=V1(U1+U2+V2\cdot W1)$ and in said P-type switching means, by the logical relation $Z1''=U1\cdot(V1+V2+U2\cdot W1)$, said logical relations Z1'and Z1''being commonly connected and represented by said output Z1, and wherein said second combined gate output $Z2=V1(U1+U2+V2\cdot W2)$ is implemented, respectively, in said N-type switching means by the logical relation $Z2'=V1\cdot(U1+U2+V2\cdot W2)$, and in said P-type switching means, by the logical relation $Z2''=U1\cdot(V1+V2+U2\cdot W2)$, said logical relations Z2'and Z2''being commonly connected and represented by said output Z2.

15. The logic element of claim 12, defined as a ternary inverting cell (TI-cell) further comprising:
a third input termination pair (A3-B3) having an input signal pair (Sa3-Sb3) respectively represented as (U2, V2), each of said first and second combined gates further comprisinq an additional non-inverting type OR gate,
said first combined gate having said additional non-invertinq type OR gate providing its output to an input of said inverting-type NAND gate,
said second combined gate having said additional non-inverting type OR gate providing its output to an input of said inverting-type NAND gate,
said first input termination (A2) of said second input termination pair being connected in common to an input of said additional non-inverting type OR gates,
said second input termination (B3) of said third input termination pair being connected in common to an input of said additional non-inverting type OR gates,
said first input termination (A3) of said third input termination pair being connected in common to an input of said additional non-inverting type OR qates, and to an input of said non-inverting type OR gates, wherein said outputs Z1 and Z2 are provided in accordance with:

$Z1=V1\cdot(U1+U2+V2\cdot W1)$, and $Z2=V1\cdot(U1+U2+V2\cdot W2)$.

16. The logic element of claim 15, defined as a symmetrical ternary inverting cell (STI-Cell), each of said first and second combined gates comprising:
N-type switching means and P-type switching means, wherein said first combined gate output $Z1=\overline{U1+V1\cdot V2\cdot(U2+W1)}$ is implemented, respectively, in said N-type switching means by the logical relation $Z1=\overline{U1+V1\cdot V2\cdot(U2+W1)}$, and in said P-type switching means, by the logical relation $Z1''=V1+U1\cdot U2\cdot(V2+W1)$, said logical relations Z1'and Z1'' being commonly connected and represented by said output Z1, and wherein said second combined gate output $Z2=\overline{U1+V1\cdot V2(U2+W2)}$, is implemented, respectively, in said N-type switching means by the logical relation $Z2'=\overline{U1+V1\cdot V2\cdot(U2+W2)}$, and in said P-type switching means, by the logical relation $Z2'=V1+U1\cdot U2\cdot(V2+W2)$, said logical relations Z2' and Z2'' being commonly 17. The logic element of claim 12, defined as a symmetrical binary inverting cell (SBI-Cell), each of said first and second combined gates comprising:
N-type switching means and P-type switching means, wherein said first combined gate output $Z1=\overline{V1\cdot(U1+W1)}$ is implemented, respectively, in said N-type switching means by the logical relation $Z1'\overline{V1\cdot(U1+W1)}$, and in said P-type switching means, by the logical relation $$Z1''=U1 \cdot (V1+W1),$$

said logical relations Z1' and Z1" being commonly connected and represented by said output Z1, and wherein said second combined gate output $$Z2=\overline{V1 \cdot (U1+W2)}$$

is implemented, respectively, in said N-type switching means by the logical relation $$Z2'=\overline{V1 \cdot (U1+W2)},$$

and in said P-type switching means, by the logical relation $$Z2''= \cdot (V1+W2),$$

said logical relations Z2' and Z2" being commonly connected and represented by said output Z2.

18. A logic element defined as a Binary Noninverting Cell (BN-cell) comprising:

two pairs of first and second inverting-type logic gates, each pair defining a combined gate;

a pair of first and second output terminations Ao-Bo; and first and second input termination pairs, each pair having first and second input terminations A1-B1 and A2-B2, said first inverting-type logic gate of said first combined gate providing its output to an input of said second inverting-type logic gate of said first combined gate, said first inverting-type logic gate of said second combined gate providing its output to an input of said second inverting-type logic gate of said second combined gate.

said first input termination (A1) of said first input termination pair being connected to an input of said first inverting-type logic gate of said first combined gate, said second input termination (B1) of said first input termination pair being connected to an input of said first inverting-type logic gate of said second combined gate, said first input termination (A2) of said second input termination pair being connected to an input of said first inverting-type logic gate of said first combined gate, and to an input of said second inverting-type logic gate of said second combined gate, said second input termination (B2) of said second input termination pair being connected to an input of said first inverting-type logic gate of said second combined gate, and to an input of said second inverting-type logic gate of said first combined gate, said second inverting-type logic gate of said first combined gate having its output connected to said first output termination (Ao), said second inverting-type logic gate of said second combined gate having its output connected to said second output termination (Bo), wherein said input termination pairs A1-B1, A2-B2 are respectively provided with input singnal pairs Sa1-Sb1, Sa2-Sb2, said input signal pairs having the logical IMPLY relationship:

$$\overline{Sai}+Sbi=1,$$

and wherein said first and second output termination pair Ao-Bo providing, respectively, a binary output signal pair Sao and Sbo, and wherein said logic element is characterized in that said first and second binary output signals Sao and Sbo are related by the logical IMPLY relationship, $$\overline{Sao}+Sbo =1.$$

19. The BN-cell logic element of claim 18 wherein each of said first and second inverting-type logic gates of said first and second combined gate pairs is a NOR gate, and where Sbi⊃Sai and Sbo⊃Sao.

20. The BN-cell logic element of claim 18 wherein each of said first and second inverting-type logic gates of said first and second combined gate pairs is a NAND gate, and where Sbi⊃Sai and Sbo⊃SaO.

21. A logic element having complementary output signals being defined as a Complementary Output (CO) cell, said CO cell comprising:

a pair of first and second logical circuits, said first logical circuit providing binary complemented output signals Sao__1 and Sao__0, and said second logical circuit providing binary complemented output signals Sbo__1 and Sbo__0, each of said logical circuits having at least first, second and third OR-NOR gates and at least first and second input termination pairs (Di;Ei) of first (Di) and second (Ei) inputs, wherein inputs D1, E1, D2 and E2 of said second logical circuit correspond to input D1, E1 D2 and E2 of said first logical circuit, having repective, binary complemented input signals, wherein said first input D1 of said first input termination pair in each of said logical circuits being connected to an input of both said first and second OR-NOR gates, said second input E1 of said first input termination pair in each of said logical circuits being connected to another input of both said first and second OR-NOR gates, said first input D2 of said second input termination pair in each of said logical circuits being connected to an input of both said first and third OR-NOR gates, said second input E2 of said second input termination pair in each of said logical circuits being connected to an input of both said second and third OR-NOR gates, a Nor output of each of said first, second and third OR-NOR gates of said first logical circuit being provided as a separate input to an OR gate having as its output said binary output signal (Sao__1)

an Or output of each of said first, second and third OR-NOR gates of said first logical circuit being commonly connected to form a wired-AND gate, having as its output said binary output signal (Sao__0), a Nor output of each of said first, second and third OR-NOR gates of said second logical circuit being provided as a separate input to an OR gate having as its output said binary output signal (Sbo__1), an Or output of each of said first, second and third OR-NOR gates of said second logical circult being commonly connected to form a wired-AND gate, having as its output said binary output signal (Sbo__0), wherein said first binary output signal Sao__1 of said first logical circuit and said first binary output signal Sbo__1 of said second logical circuit are related by the IMPLY relationship: $\overline{Sao\_1}+Sbo\_1=1$, where $Sbo\_1 \supset Sao\_1$, and wherein said first binary output signal Sao__0 of said first logical circuit and said first binary output signal Sbo__0 of said second logical circuit are related by the IMPLY relationship: $\overline{Sao\_0}+Sbo\_0=1$, where $Sbo\_0 \supset Sao\_0$.

* * * * *